United States Patent
Yamaguchi et al.

(10) Patent No.: US 7,421,027 B2
(45) Date of Patent: Sep. 2, 2008

(54) FRAME CONVERSION APPARATUS AND FRAME CONVERSION METHOD

(75) Inventors: Akira Yamaguchi, Kanagawa (JP); Koji Kamiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 10/406,877

(22) Filed: Apr. 4, 2003

(65) Prior Publication Data

US 2003/0219238 A1 Nov. 27, 2003

(30) Foreign Application Priority Data

Apr. 5, 2002 (JP) ............................. 2002-103544

(51) Int. Cl.
*H04N 7/18* (2006.01)
(52) U.S. Cl. ............................. 375/240.26; 375/240.25
(58) Field of Classification Search ........... 348/80–120; 375/239–241
See application file for complete search history.

(56) References Cited

U.S. PATENT DOCUMENTS 5,355,169 A * 10/1994 Richards et al. ............. 348/459
5,398,071 A * 3/1995 Gove et al. .................. 348/558
5,428,399 A * 6/1995 Robinson et al. ............ 348/459
5,461,420 A * 10/1995 Yonemitsu et al. ..... 375/240.15
5,646,693 A * 7/1997 Cismas ....................... 348/441
5,757,435 A * 5/1998 Wells ........................ 348/441
5,805,207 A * 9/1998 Watkinson et al. ............ 348/97
5,910,822 A 6/1999 Yamaguchi et al.
5,929,902 A * 7/1999 Kwok .......................... 348/96

FOREIGN PATENT DOCUMENTS

| JP | 11 232313 | 8/1999 |
| JP | 11 252513 | 9/1999 |
| JP | 2001 160920 | 6/2001 |
| JP | 2002 16944 | 1/2002 |
| WO | WO 99 57897 | 11/1999 |

* cited by examiner

*Primary Examiner*—Andy S Rao
(74) *Attorney, Agent, or Firm*—Frommer Lawrence & Haug LLP; William S. Frommer; Paul A. Levy

(57) ABSTRACT

When a CCU is supplied with a 60*i* format compliant video signal generated by applying a frame conversion based on the 2-3 pull down technique to a 24 PsF format compliant video signal, the CCU performs a reverse frame conversion corresponding to this frame conversion. When the CCU is supplied with a 60*i* format pure video signal with no frame conversion applied, the CCU performs a frame conversion by skipping fields in units of frames in accordance with a conversion ratio. The CCU selectively changes the two conversions in accordance with 60*i* format compliant video signals supplied.

20 Claims, 15 Drawing Sheets

FRAME CONVERSION APPARATUS AND FRAME CONVERSION METHOD

BACKGROUND OF THE INVENTION

1. Field of the Invention

The present invention relates to a frame conversion apparatus and a frame conversion method of converting a video signal comprising a given frame rate into another video signal comprising a frame rate lower than that frame rate.

2. Description of Related Art

In recent years, there is a widespread use of a multi-format camera system using a multi-format video camera for broadcasting or business use that images so-called HDTV (High Definition TeleVision) video signals for input and/or output. Formats for HDTV video signals include the 1080/60i format, the 1080/59.94i, the 1080/50i format, and the like. The 1080/60i format supports images of 1,080 interlace scanning lines and 60 fields per second. The 1080/59.94i format supports images of 1,080 interlace scanning lines and 59.94 fields per second. The 1080/50i format supports images of 1,080 interlace scanning lines and 50 fields per second. Nowadays, there are also developed formats much suited for motion-picture films such as the 24 PsF format having images of 24 frames per second based on progressive scanning and the 23.976 PsF format having images of 23.976 frames per second based on progressive scanning. The 24 PsF format transmits 24P format compliant video signals using the 48i format in terms of transmission.

For convenience of description, the 60i format, the 59.94i format, and the 50i format are generically referred to as a 60i-type format. The 24 PsF format and the 23.976 PsF format are generically referred to as a 24P-type format.

With respect to camera systems, there is developed a multi-format camera system that can image video signals compliant with more than one format for input and/or output instead of imaging video signals compliant with a specific one of these various formats for input and/or output.

FIG. 10 shows an example of such multi-format camera system that comprises a multi-format video camera 200, a Camera Control Unit (hereafter referred to as a CCU) 210, a Master Setup Unit (hereafter referred to as an MSU) 220, and a plurality of multi-format monitors $230_1$, and $230_2$. The multi-format video camera 200 can image video signals compliant with more than one format. The CCU 210 controls the multi-format video camera 200 and performs various processes. The MSU 220 controls the CCU 210. The multi-format monitors $230_1$ and $230_2$ can reproduce and output video signals compliant with a plurality of formats.

The multi-format video camera 200 is connected to the CCU 210 via an optical fiber cable 140 and images an object under control of the CCU 210. After imaging and obtaining video signals compliant with various formats, the multi-format video camera 200 transmits these signals to the CCU 201 via the optical fiber cable 140. Further, the multi-format video camera 200 can receive a return signal as a video signal compliant a specific format from the CCU 210 via the optical fiber cable 140. In this case, the multi-format video camera 200 presents this video signal to an imaging user or the like via a view finder (not shown) or transmits the video signal to externally connected devices.

The CCU 210 is connected to the multi-format video camera 200 via the optical fiber cable 140. Under control of the MSU 220, the CCU 210 controls the multi-format video camera 200 by supplying it with drive power via the optical fiber cable 140 or transmitting a control signal to the multi-format video camera 200. Also under control of the MSU 220, the CCU 210 processes video signals received from the multi-format video camera 200 via the optical fiber cable 140. Furthermore, under control of the MSU 220, the CCU 210 receives a video signal compliant with one format from the multi-format video camera 200 via the optical fiber cable 140 and converts this signal into a video signal compliant with another format according to output destinations. Under control of the MSU 220, the CCU 210 distributes video signals $OP_1$ and $OP_2$ via a switcher (not shown) and the like and transmits these signals to, e.g., multi-format monitors $230_1$ and $230_2$ connected via an HD-SDI (High Definition-Serial Digital Interface) compliant serial bus or the like. When the CCU 210 receives a return signal RET from the outside via the HD-SDI compliant serial bus under control of the MSU 220, for example, the CCU 210 converts the format of this signal into the format for the multi-format video camera 200 and transmits the signal to the multi-format video camera 200 via the optical fiber cable 140.

The MSU 220 is a controller forming the core of the multi-format camera system and controls the CCU 210 connected to the individual multi-format video camera 200 to globally control the multi-format camera system.

The multi-format monitors $230_1$ and $230_2$ are provided as an example of devices connected to the CCU 210. The multi-format monitors $230_1$ and $230_2$ receive video signals $OP_1$ and $OP_2$ compliant with various formats via the switcher (not shown) and the like and present the received signals to an editor and the like in the multi-format camera system.

When the multi-format video camera 200 images a video signal compliant with one format in this multi-format camera system, the corresponding CCU 210 can process the signal, apply a frame conversion to the signal according to an output destination, and then distribute the signal to devices such as the multi-format monitors $230_1$ and $230_2$. The multi-format camera system may be supplied with return signals RET, i.e., video signals compliant with various formats, such as video signals transmitted from another video camera (not shown) or those constituting programs of the other channels. In such case, the CCU 210 can apply a frame conversion and the like to these signals and transmit them to the multi-format video camera 200. The multi-format camera system can handle video signals compliant with not only a specific format, but also a plurality of formats.

Since the above-mentioned multi-format camera system can handle a plurality of formats, the CCU 210 often performs the frame conversion. When the multi-format video camera 200 operates in the 24P-type format, for example, the multi-format camera system can transmit a 24P-type format compliant video signal to the multi-format monitor $230_1$, wherein this signal can be obtained by not performing frame conversions in the CCU 210. On the other hand, the system can transmit a 60i-type format compliant video signal to the multi-format monitor $230_2$, wherein this signal can be obtained by applying a frame conversion in the CCU 210 to the 24P-type format compliant video signal. That is to say, the CCU 210 generates a 60i-type format compliant video signal by performing the frame conversion based on the so-called 2-3 pull down technique for the 24P-type format compliant video signal.

More specifically, the CCU 210 performs the frame conversion based on the 2-3 pull down technique as shown in FIG. 11 when converting the 24 PsF format compliant video signal into the 60i format compliant video signal, i.e., when converting a video signal comprising 24 frames per second into a video signal comprising 60 fields per second. As shown in the middle of FIG. 11, the CCU 210 is supplied with the 24 PsF format compliant video signal comprising fields of "A1", "A2", "B1", "B2", "C1", "C2", "D1", "D2", and so on. A frame gate signal is supplied from the outside as shown at the top of FIG. 11 and synchronizes with the beginning of field "B1". Based on the frame gate signal, as shown at the bottom of FIG. 11, the CCU 210 reinserts field "A1" immediately after field "A2", inserts fields "B2" and "B1" with a reverse order immediately after this field "A1", inserts fields "C2" and "C1" with a reverse order immediately after field "B1", and reinserts field "C2" immediately after field "C1". In this manner, the CCU 210 converts four frames of the input 24 PsF format compliant video signal, i.e., eight fields into ten fields. The CCU 210 can align phases for the succeeding fields by performing the conversion at this cycle and finally generate a 60i format compliant video signal comprising fields "A1", "A2", "A1", "B2", "B1", "C2", "C1", "C2", "D1", "D2", and so on with an alternate order of odd-numbered and even-numbered fields.

Likewise, the CCU 210 also perform the frame conversion based on the 2-3 pull down technique when converting a 23.976 PsF format compliant video signal into a 59.94i format compliant video signal.

Further, the CCU 210 performs the frame conversion based on the 2-3 pull down technique as shown in FIG. 12 when converting the 24 PsF format compliant video signal into the 50i format compliant video signal, i.e., when converting a video signal comprising 24 frames per second into a video signal comprising 50 fields per second. As shown in the middle of FIG. 12, the CCU 210 is supplied with the 24 PsF format compliant video signal comprising fields of "A1", "A2", "B1", "B2", "C1", "C2", ..., "K1", "K2", "L1", "L2", "M1", "M2", "N1", "N2", "O1", "O2", ..., "W1", "W2", "X1", "X2", and soon. A frame gate signal is supplied from the outside as shown at the top of FIG. 12 and synchronizes with the beginning of field "B1". Based on the frame gate signal, as shown at the bottom of FIG. 12, the CCU 210 reinserts field "A1" immediately after field "A2", inserts fields "B2" and "B1" with a reverse order immediately after this field "A1", inserts fields "C2" and "C1" with a reverse order immediately after field "B1", and so on. Immediately after inserting fields "K2" and "K1" with a reverse order, the CCU 210 inserts fields "L2" and "L1" with a reverse order, inserts fields "M2" and "M1" with a reverse order immediately after field "L1", and reinserts field "M2" immediately after field "M1". In this manner, the CCU 210 converts 24 frames of the input 24 PsF format compliant video signal, i.e., 48 fields into 50 fields. The CCU 210 can align phases for the succeeding fields by performing the conversion at this cycle and finally generate a 50i format compliant video signal comprising fields "A1", "A2", "A1", "B2", "B1", "C2", "C1", ..., "K2", "K1", "L2", "L1", "M2", "M1", "M2", "N1", "N2", "O1", "O2", ..., "W1", "W2", "X1", "X2", and so on with an alternate order of odd-numbered and even-numbered fields.

In the multi-format camera system, as mentioned above, the CCU 210 can perform the frame conversion based on the 2-3 pull down technique for the 24P-type format compliant video signal to convert the signal into a 60i-type format compliant video signal.

When the multi-format camera system operates the multi-format video camera 200 in the 24P-type format, the CCU 210 maybe supplied with a 60i-type format compliant video signal as a return signal RET. In such case, the CCU 210 performs a reverse frame conversion corresponding to the frame conversion based on the 2-3 pull down technique to generate a 24P-type format compliant video signal.

More specifically, the CCU 210 performs a reverse frame conversion as shown in FIG. 13 when converting a 60i format compliant video signal processed by the same conversion as the frame conversion based on the 2-3 pull down technique as shown in FIG. 11 into a 24 PsF format compliant video signal. As shown at the top in FIG. 13, the CCU 210 is supplied with a 60i format compliant video signal processed by the frame conversion based on the 2-3 pull down technique, wherein the signal comprises fields "A1", "A2", "A1", "B2", "B1", "C2", "C1", "C2", "D1", "D2", and so on. The CCU 210 then extracts fields "A1", "A2", "B1", "B2", "C1", "C2", "D1", "D2", and so on as shown at the bottom in FIG. 13. In this manner, the CCU 210 converts five frames of the input 60i format compliant video signal, i.e., ten fields into eight fields. The CCU 210 can perform the conversion for the succeeding fields at this cycle and finally generate a 24 PsF format compliant video signal comprising fields "A1", "A2", "B1", "B2", "C1", "C2", "D1", "D2", and so on by maintaining the correct relation on the time axis with an alternate order of odd-numbered and even-numbered fields.

Further, the CCU 210 performs a reverse frame conversion as shown in FIG. 14 when converting a 50i format compliant video signal processed by the same conversion as the frame conversion based on the 2-3 pull down technique as shown in FIG. 12 into a 24 PsF format compliant video signal. As shown at the top in FIG. 14, the CCU 210 is supplied with a 50i format compliant video signal processed by the frame conversion based on the 2-3 pull down technique, wherein the signal comprises fields "A1", "A2", "A1", "B2", "B1", "C2", "C1", ..., "K2", "K1", "L2", "L1", "M2", "M1", "M2", "N1", "N2", "O1", "O2", ..., "W1", "W2", "X1", "X2", and so on. The CCU 210 then extracts fields "A1", "A2", "B1", "B2", "C1", "C2", ..., "K1", "K2", "L1", "L2", "M1", "M2", "N1", "N2", "O1", "O2", ..., "W1", "W2", "X1", "X2", and so on as shown at the bottom in FIG. 14. In this manner, the CCU 210 converts 25 frames of the input 50i format compliant video signal, i.e., 50 fields into 48 fields. The CCU 210 can perform the conversion for the succeeding fields at this cycle and finally generate a 24 PsF format compliant video signal comprising fields "A1", "A2", "B1", "B2", "C1", "C2", ..., "K1", "K2", "L1", "L2", "M1", "M2", "N1", "N2", "O1", "O2", ..., "W1", "W2", "X1", "X2", and so on by maintaining the correct relation on the time axis with an alternate order of odd-numbered and even-numbered fields.

In the multi-format camera system, the CCU 210 can perform the reverse frame conversion for a 60i-type format compliant video signal processed by the frame conversion based on the 2-3 pull down technique to generate a 24P-type format compliant video signal comprising fields maintaining the correct relation on the time axis.

When the multi-format camera system operates the multi-format video camera 200 in the 24P-type format, however, the CCU 210 may be supplied with the return signal RET comprising a 60i format compliant pure video signal not processed by the frame conversion based on the 2-3 pull down technique instead of a 60i format compliant video signal processed by this frame conversion. In this case, if the CCU 210 performs the reverse frame conversion as shown in FIG. 13 or 14, there is generated a 24P-type format compliant video signal comprising fields having the reverse relation on the time axis.

More specifically, the CCU 210 performs a reverse frame conversion as shown in FIG. 15 when converting a 60i format compliant pure video signal not processed by the frame conversion into a 24 PsF format compliant video signal. As shown at the top in FIG. 15, the CCU 210 is supplied with a 60i format compliant pure video signal not processed by the frame conversion based on the 2-3 pull down technique, wherein the signal comprises fields "Ao", "Ae", "Bo", "Be", "Co", "Ce", "Do", "De", "Eo", "Ee", and so on. The CCU 210 generates a 24 PsF format compliant video signal comprising fields "Ao", "Ae", "Co", "Be", "Do", "Ce", "Eo", "Ee", and so on as shown at the bottom in FIG. 15. The 24 PsF format compliant video signal should comprise fields duly arranged in the order of "A", "B", "C", "D", "E", and so on. Actually, however, the relation on the time axis is reversed for two fields "Co" and "Be" equivalent to the second frame. In addition, the relation on the time axis is reversed for two fields "Do" and "Ce" equivalent to the third frame.

Furthermore, the CCU 210 performs a reverse frame conversion as shown in FIG. 16 when converting a 50i format compliant pure video signal not processed by the frame conversion into a 24 PsF format compliant video signal. As shown at the top in FIG. 16, the CCU 210 is supplied with a 50i format compliant pure video signal not processed by the frame conversion based on the 2-3 pull down technique, wherein the signal comprises fields "Ao", "Ae", "Bo", "Be", "Co", "Ce", "Do", and so on. The CCU 210 generates a 24 PsF format compliant video signal comprising fields "Ao", "Ae", "Co", "Be", "Do", "Ce", and so on as shown at the bottom in FIG. 16. The 24 PsF format compliant video signal should comprise fields duly arranged in the order of "A", "B", "C", "D", and soon. Actually, however, the relation on the time axis is reversed for two fields, "Co" and "Be" equivalent to the second frame. In addition, the relation on the time axis is reversed for two fields "Do" and "Ce" equivalent to the third frame.

The multi-format camera system may allow a mix of two types of video signals, i.e., a 60i-type format compliant video signal processed by the frame conversion based on the 2-3 pull down technique and a 60i-type format compliant pure video signal not processed by the frame conversion as a return signal RET. The CCU 210 performs the same reverse frame conversion for both types of video signals. When the reverse frame conversion is performed for the 60i-type format compliant pure video signal not processed by the frame conversion, there is generated a 24P-type format compliant video signal comprising fields having the reverse relation on the time axis. Accordingly, the multi-format camera system causes exaggerated uncomfortable feeling in an image as the return signal output from the multi-format video camera 200.

This problem is not limited to the conversion from the 60i-type format into 24P-type format. When the pull down function is performed in units of fields, and formats are converted from a high frame rate to a low frame rate, the problem occurs in any of conversions from the i-type format into the i-type format, from the P-type format into the P-type format, from the P-type format into the i-type format, and from the i-type format into the P-type format.

SUMMARY OF THE INVENTION

The present invention has been made in consideration of the foregoing. It is therefore an object of the present invention to provide a frame conversion apparatus and a frame conversion method capable of performing an appropriate frame conversion for an input video signal during conversion from a format having a high frame rate into a format having a low frame rate and outputting images with decreased uncomfortable feeling and free from anomalies.

In order to achieve the above-mentioned object, a frame conversion apparatus according to one aspect of the present invention converts a first video signal comprising a first frame rate into a second video signal comprising a second frame rate that is lower than the first frame rate, comprising: a signal input means for inputting the first video signal; a frame conversion means for selectively changing a first conversion and a second conversion in accordance with the first video signal supplied from the signal input means, wherein the first conversion is a reverse frame conversion corresponding to a frame conversion of a video signal comprising the second frame rate based on a pull down technique into a video signal comprising the first frame rate, and wherein the second conversion is a frame conversion by means of a frame-based skip process according to a conversion ratio, namely, a ratio between the second frame rate and the first frame rate; and a signal output means for outputting the second video signal generated by the frame conversion means.

In order to achieve the above-mentioned object, a frame conversion method of converting a first video signal according to another aspect of the present invention comprises a first frame rate into a second video signal comprising a second frame rate that is lower than the first frame rate, the method comprising the steps of: inputting the first video signal; selectively changing a first conversion and a second conversion in accordance with the first video signal, wherein the first conversion is a reverse frame conversion corresponding to a frame conversion of a video signal comprising the second frame rate based on a pull down technique into a video signal comprising the first frame rate, and wherein the second conversion is a frame conversion by means of a frame-based skip process according to a conversion ratio, namely, a ratio between the second frame rate and the first frame rate; and outputting the second video signal.

Other and further objects, features and advantages of the invention will appear more fully from the following description.

DETAILED DESCRIPTION OF THE PREFERRED EMBODIMENTS

Embodiments of the present invention will be described in further detail with reference to the accompanying drawings.

The present embodiment provides a multi-format camera system using a multi-format video camera for broadcasting or business use that images so-called HDTV (High Definition Television) video signals for input and/or output. The multi-format camera system is configured to transmit a video and/or speech signal as a return signal to the multi-format video camera via a camera control unit (hereafter referred to as a CCU) connected to the multi-format video camera. The multi-format camera system uses the CCU to supply the video signal as a return signal with frame conversion into a format having a low frame rate so that the frame conversion is appropriate to the video signal. It is possible to output images with decreased uncomfortable feeling and free from anomalies to the multi-format video camera.

Formats for HDTV video signals include the 1080/60i format, 1080/59.94i format, 1080/50i format, 24 PsF format, 23.976 PsF format, and the like. For convenience of description, the 60i format, 59.94i format, and 50i format are generically referred to as the 60i-type format. The 24 PsF format and 23.976 PsF are generically referred to as the 24P-type format.

Also for convenience of description, the following uses the 60i format and the 50i format as examples of the 60i-type format. The 24 PsF format is uses as an example of the 24P-type format. The following describes the multi-format camera system that performs frame conversion from the 60i format or the 50i format into the 24 PsF format.

Further, the speech signal is multiplexed with the video signal for transmission or is transmitted independently of the video signal by means of optical fiber and the other transmission means. Since the following describes the frame conversion for video signals, however, there is basically omitted the description about speech signals interchanged between devices.

Figure 1:
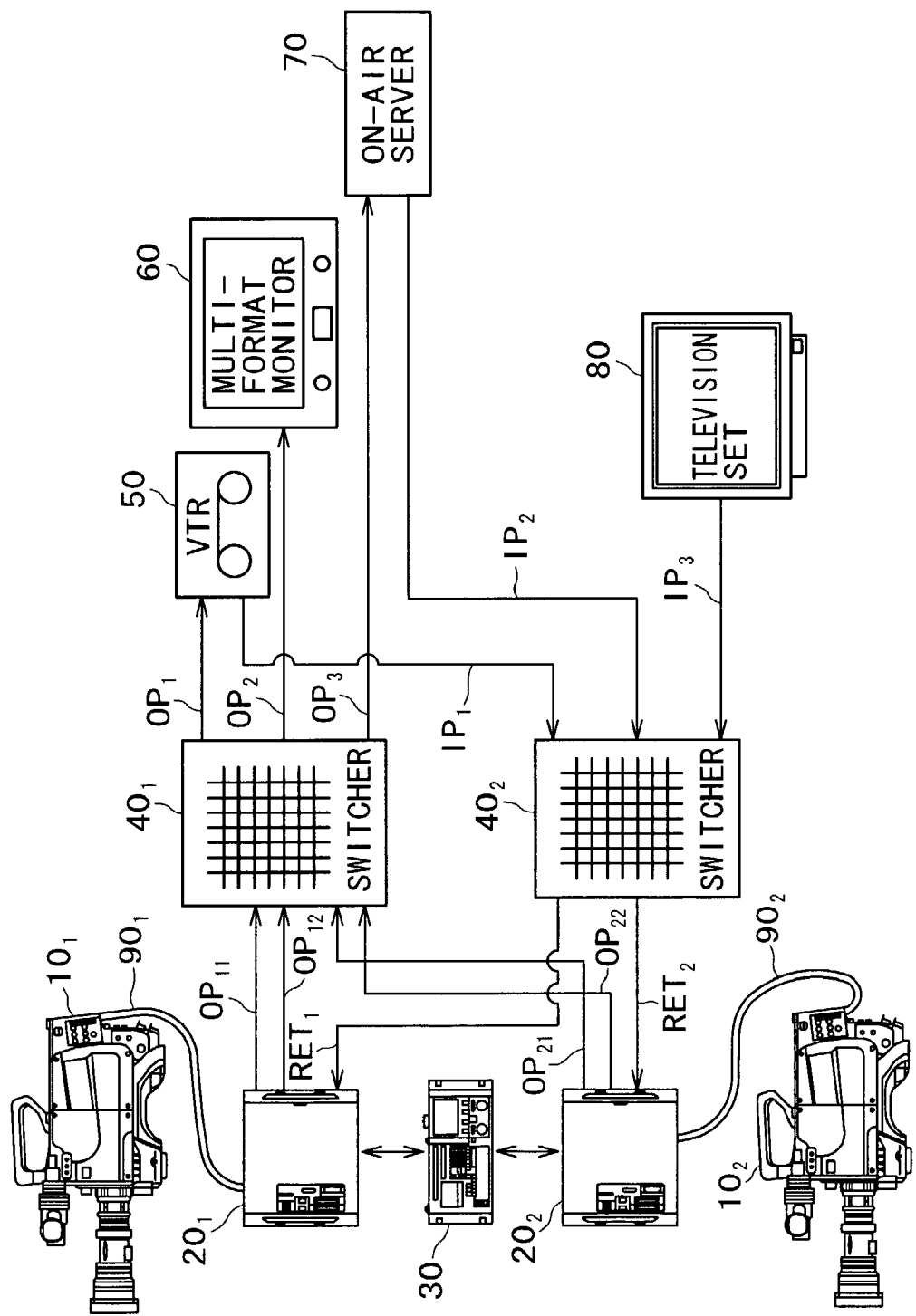
FIG. 1 illustrates a configuration of a multi-format camera system according to an embodiment of the present invention.

As shown in FIG. 1, for example, the multi-format camera system comprises a plurality of multi-format video cameras $10_1$ and $10_2$ capable of imaging video signals compliant with a plurality of formats; CCUs $20_1$ and $20_2$ to respectively control the multi-format video cameras $10_1$ and $10_2$ for various processes; a master setup unit (MSU) 30 to control the CCUs $20_1$ and $20_2$; a switcher $40_1$ to distribute video signals generated from the CCUs $20_1$ and $20_2$ to output destinations; a switcher $40_2$ to distribute externally supplied video signals as return signals $RET_1$ and $RET_2$ to the CCUs $20_1$ and $20_2$, respectively; a VTR (video tape recorder) 50 to store 24 PsF format compatible video signals onto a tape-shaped recording medium; a multi-format monitor 60 capable of reproducing and outputting video signals compliant with a plurality of formats; an on-air server 70 to edit and transmit video signals as materials for on-air broadcasting; and a television set 80 to receive and provide the other channel programs.

The multi-format video camera $10_1$ and $10_2$ are connected to the CCU $20_1$ and $20_2$ via optical fiber cables $90_1$ and $90_2$ and image an object under control of the CCUs $20_1$ and $20_2$. The multi-format video cameras $10_1$ and $10_2$ transmit imaged video signals compliant with various formats to the CCUs $20_1$ and $20_2$ via the optical fiber cables $90_1$ and $90_2$, respectively. The multi-format video cameras $10_1$ and $10_2$ receive return signals, i.e., video signal compliant with a format from the CCUs $20_1$ and $20_2$ via the optical fiber cables $90_1$ and $90_2$. The video signals are provided to an imaging user via a view finder (not shown) or are transmitted to externally connected devices such as a VTR (not shown).

The CCUs $20_1$ and $20_2$ are each connected to the multi-format video cameras $10_1$ and $10_2$ via the optical fiber cables $90_1$ and $90_2$, respectively. Under control of an MSU 30, the CCUs $20_1$ and $20_2$ each control the multi-format video camera $10_1$ and $10_2$ by supplying them with driver power via the optical fiber cables $90_1$ and $90_2$ and issuing control signals such as various commands. Further, under control of the MSU 30, the CCUs $20_1$ and $20_2$ each receive video signals from the multi-format video cameras $10_1$ and $10_2$ via the optical fiber cables $90_1$ and $90_2$, respectively, and, in accordance with the received signals, generate control signals or process signals for the cameras such as lens diaphragm adjustments, contour correction, and/or gamma correction, for example. Moreover, under control of the MSU 30, the CCUs $20_1$ and $20_2$ each receive video signals compliant with a format from the multi-format video cameras $10_1$ and $10_2$ via the optical fiber cables $90_1$ and $90_2$, respectively, and convert these video signals into those compliant with another format in accordance with an output destination. Furthermore, under control of the MSU 30, the CCUs $20_1$ and $20_2$ each supply the $40_1$ with 24 PsF format compliant video signals $OP_{11}$ and $OP_{21}$ and 60i or 50i format compliant video signals $OP_{12}$ and $OP_{22}$. Still further, under control of the MSU 30, the CCUs $20_1$ and $20_2$ each convert the format for the video signals as the return signals $RET_1$ and $RET_2$ supplied from the switcher $40_2$ into the format for the multi-format video cameras $10_1$ and $10_2$ and transmit the format to the multi-format video cameras $10_1$ and $10_2$ via the optical fiber cables $90_1$ and $90_2$.

The MSU 30 is a core control apparatus in the multi-format camera system. The MSU 30 controls the multi-format camera system in a centralized fashion by controlling the CCUs $20_1$ and $20_2$ connected to the multi-format video cameras $10_1$ and $10_2$, respectively.

The switcher $40_1$ distributes the 24 PsF format compliant video signals $OP_{11}$ and $OP_{21}$ and the 60 i or 50i format compliant video signals $OP_{12}$ and $OP_{22}$ respectively supplied from the CCUs $20_1$ and $20_2$ to output destinations. When a VTR 50 processes 24 PsF format compliant video signals, for example, the switcher $40_1$ controls internal signal paths so as to output the 24 PsF format compliant video signal $OP_11$ supplied from the CCU $20_1$ and the 24 PsF format compliant video signal $OP_{21}$ supplied from the CCU $20_2$ as a 24 PsF format compliant video signal $OP_1$ to the VTR 50. When supplying a 50i format compliant video signal to the multi-format monitor 60, the switcher $40_1$ controls internal signal paths so as to output the 50i format compliant video signal $OP_{12}$ supplied from the CCU $20_1$ and the 50i format compliant video signal $OP_{22}$ supplied from the CCU $20_2$ as a 50i format compliant video signal $OP_2$ to the multi-format monitor 60. Further, when the on-air server 70 transmits a video signal that needs to comply with the 60i format, for example, the switcher 40, controls internal signal paths so as to output the 60i format compliant video signal $OP_{12}$ supplied from the CCU $20_1$ and the 60i format compliant video signal $OP_{22}$ supplied from the CCU 202 as a 60i format compliant video signal $OP_3$.

The switcher $40_2$ distributes externally input video signals as the return signals $RET_1$ and $RET_2$ to the CCUs $20_1$ and $20_2$, respectively. The externally input video signals include a 24 PsF format compliant video signal $IP_1$ transmitted from the VTR 50, a 60i format compliant video signal $IP_2$ output from the on-air server 70, and a 60 i format compliant $IP_3$ transmitted from the television set 80.

The VTR 50 is an example of devices connected to the CCUs $20_1$ and $20_2$. The VTR 50 is connected to the CCUs $20_1$ and $20_2$, e.g., via an HD-SDI (High Definition-Serial Digital Interface) compliant serial bus, receives therefrom the 24 PsF format compliant video signal $OP_1$ via the switcher $40_1$, and records this signal on a tape-shaped recording medium. The VTR 50 reproduces the 24 PsF format compliant video signal recorded on the tape-shared recording medium and transmits this signal as the video signal $IP_1$ according to need to the CCUs $20_1$ and $20_2$ connected through the HD-SDI compliant serial bus or the like via the switcher $40_2$.

The multi-format monitor 60 is an example of devices connected to the CCUs $20_1$ and $20_2$. The multi-format monitor 60 is connected to the CCUs $20_1$ and $20_2$, e.g., via the HD-SDI compliant serial bus, receives therefrom the video signal $OP_2$ compliant with various formats such as the 50i format via the switcher $40_1$, and presents this signal to editors and the like in the multi-format camera system.

The on-air server 70 is an example of devices connected to the CCUs $20_1$ and $20_2$. The on-air server 70 is connected to the CCUs $20_1$ and $20_2$, e.g., via the HD-SDI compliant serial bus, receives therefrom the 60i format compliant video signal $OP_3$ via the switcher $40_1$, edits the signal and transmits it to the outside. The on-air server 70 transmits the edited 60i format compliant video signal as the video signal $IP_2$ according to need to the CCUs $20_1$ and $20_2$ connected through the HD-SDI compliant serial bus or the like via the switcher $40_2$.

The television set 80 is an example of devices connected to the CCUs $20_1$ and $20_2$, and receives and presents the other channel programs. When the received program comprises a 60i format compliant pure video signal with no frame conversion applied, the television set 80 transmits this signal as the video signal $IP_3$ according to need to the CCUs $20_1$ and $20_2$ connected through the HD-SDI compliant serial bus or the like via the switcher $40_2$.

In such multi-format camera system, the multi-format video cameras $10_1$ and $10_2$ each image video signals compliant with one format. The corresponding CCUs $20_1$ and $20_2$ applies the frame conversion or other processes to the signals in accordance with output destinations. The signals can be distributed to devices such as the VTR 50, the multi-format monitor 60, and the on-air server 70 via the switcher $40_1$. In the multi-format camera system, video signals compliant with various formats are transmitted from devices such as the VTR 50, the on-air server 70, and the television set 80. These signals are input as the return signals $RET_1$ and $RET_2$ to the CCUs $20_1$ and $20_2$ respectively via the switcher $40_2$. The CCUs $20_1$ and $20_2$ each apply processes such as the frame conversion to the return signals $RET_1$ and $RET_2$ as the video signals. The processed signals can be transmitted to the multi-format video cameras $10_1$ and $10_2$, respectively. In this manner, the multi-format camera system can process video signals compliant with not only one format, but also a plurality of formats.

The multi-format camera system can operate the multi-format video camera $10_1$ in the 24P-type format. The CCU $20_1$ can transmit the 24P-type format compliant video signal $OP_{11}$ to the VTR 50 and the like via the switcher $40_1$, wherein the video signal $OP_{11}$ is obtained without frame conversion. On the other hand, the CCU $20_1$ can apply the frame conversion based on the 2-3 pull down technique to a 24 PsF format compliant video signal to generate the 60i format compliant video signal $OP_{12}$. The video signal $OP_{12}$ can be transmitted to the multi-format monitor 60, the on-air server 70, and the like via the switcher $40_1$.

When the multi-format camera system operates the multi-format video camera $10_1$ in the 24P-type format, the 24 PsF format compliant video signal becomes the return signal $RET_1$ such as the video signal $IP_1$ output from the VTR 50 via the switcher $40_2$. In this case, the CCU 20, can supply the signal as is to the multi-format video camera $10_1$ without frame conversion. When a 60i-type format compliant video signal becomes the return signal $RET_1$ such as the video signal $IP_2$ output from the on-air server 70 via the switcher $40_2$ or the video signal $IP_3$ output from the television set 80 via the switcher $40_2$, the CCU $20_1$ applies the frame conversion to the signal and supplies it to the multi-format video camera $10_1$.

The following shows an example of generating a video signal as the return signal $RET_1$. The multi-format video camera $10_1$ images a 24P-type format compliant video signal. The CCU $20_1$ applies the frame conversion based on the 2-3 pull down technique to that signal to generate a 60i-type format compliant video signal. The generated signal is transmitted to the on-air server 70 which then retransmits the signal. Likewise, the other multi-format video camera $10_2$ images a 24P-type format compliant video signal. The CCU $20_2$ applies the frame conversion based on the 2-3 pull down technique to that signal to generate a 60i-type format compliant video signal. The generated signal is transmitted to the on-air server 70 which then retransmits the signal. That is to say, the video signal is generated through the same frame conversion as that performed by the multi-format video camera $10_1$.

There is another example of a video signal as the return signal $RET_1$ such as a 60i-type format compliant video signal received by the television set 80. In this case, the video signal is a pure one that is not subject to the same frame conversion as that performed by the multi-format video camera $10_1$.

As mentioned above, the multi-format camera system allows a mix of 60i-type format compliant video signals subject to the frame conversion based on the 2-3 pull down technique and 60i-type format compliant pure video signals without frame conversion applied as the return signal $RET_1$. Obviously, the same applies to the return signal $RET_2$. The following description only concerns the return signal $RET_1$.

When the frame conversion based on the 2-3 pull down technique is applied to a 60i-type format video signal which is then input as the return signal $RET_1$, the CCU $20_1$ generates a 24P-type format compliant video signal by performing the reverse frame conversion corresponding to the frame conversion based on the 2-3 pull down technique. On the other hand, the CCU $20_1$ performs a new frame conversion proposed below when no frame conversion is applied to a 60i-type format compliant pure video signal which is then input as the return signal $RET_1$.

First, the following describes conversion of a 60i format compliant pure video signal with no frame conversion applied into a 24 PsF format compliant video signal.

This frame conversion converts 60 images into 48 images. Let us consider a ratio, i.e., a conversion ratio of the frame rate for 60i format compliant video signals and the frame rate for 24 PsF format compliant video signals. The conversion ratio is 60:48=10:8. Accordingly, the CCU $20_1$ is capable of consistent frame conversion by simply skipping two fields from ten fields of a 60i format compliant input video signal. Although the conversion ratio is 60:48=10:8=5:4, one field is not skipped from five fields of a 60i format compliant input video signal. This is because a video signal constitutes one frame in units of two fields. Skipping just one field invalidates the relation between an odd-numbered field and an even-numbered field.

Figure 2:
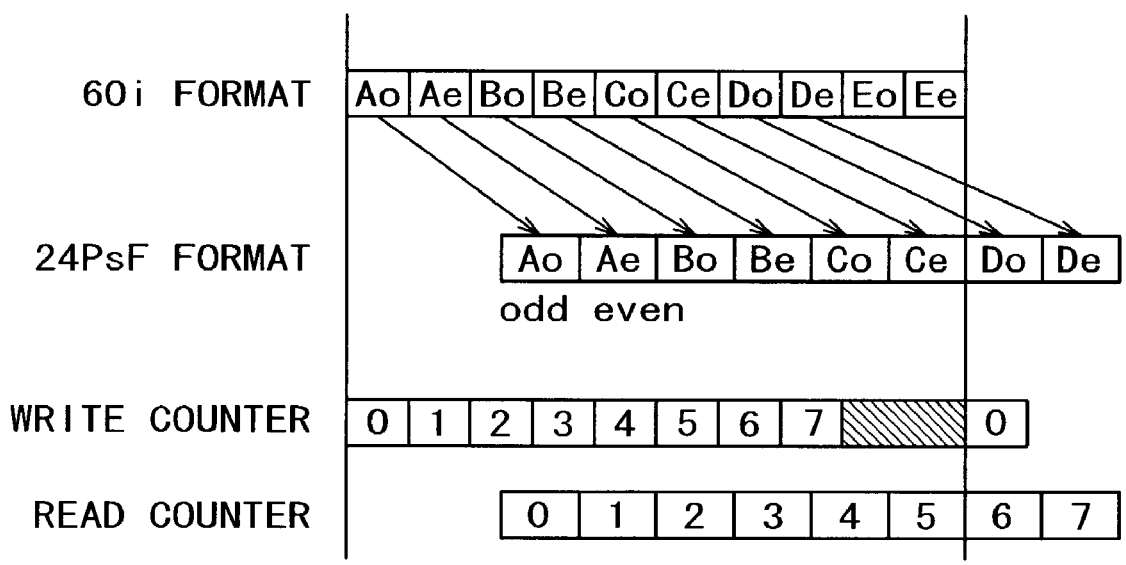
FIG. 2 illustrates frame conversion from a pure, not frame-converted video signal compliant with the 60i format into a video signal compliant with the 24 PsF format.

More specifically, as shown at the top row in FIG. 2, the CCU $20_1$ is supplied with a 60i format compliant pure video signal with no frame conversion applied, wherein the signal comprises fields "Ao", "Ae", "Bo", "Be", "Co", "Ce", "Do", "De", "Eo", "Ee", and so on. The CCU $20_1$ then removes two consecutive fields "Eo" and "Ee" as shown at the second row from the top in FIG. 2. Finally, the CCU $20_1$ can generate a 24 PsF format compliant video signal comprising fields "Ao", "Ae", "Bo", "Be", "Co", "Ce", "Do", "De", and so on in an alternate sequence of odd-numbered and even-numbered fields with the correct relation on the time axis.

Though not shown in the figure, the CCU $20_1$ may convert a 59.94i format compliant pure video signal with no frame conversion applied into a 23.976 PsF format compliant video signal. Also in this case, it is possible to generate a 23.976 PsF format compliant video signal with the correct relation on the time axis by skipping two fields from ten fields of the 59.94i format compliant input video signal.

Then, the following describes conversion of a 50i format compliant pure video signal with no frame conversion applied into a 24 PsF format compliant video signal.

This frame conversion converts 50 images into 48 images. Let us consider a ratio, i.e., a conversion ratio of the frame rate for 50i format compliant video signals and the frame rate for 24 PsF format compliant video signals. The conversion ratio is 50:48. Accordingly, the CCU $20_1$ is capable of consistent frame conversion by simply skipping two fields from 50 fields of a 50i format compliant input video signal. Although the conversion ratio is 50:48=25:24, one field is not skipped from 25 fields of a 50i format compliant input video signal. This is because a video signal constitutes one frame in units of two fields as mentioned above.

Figure 3:
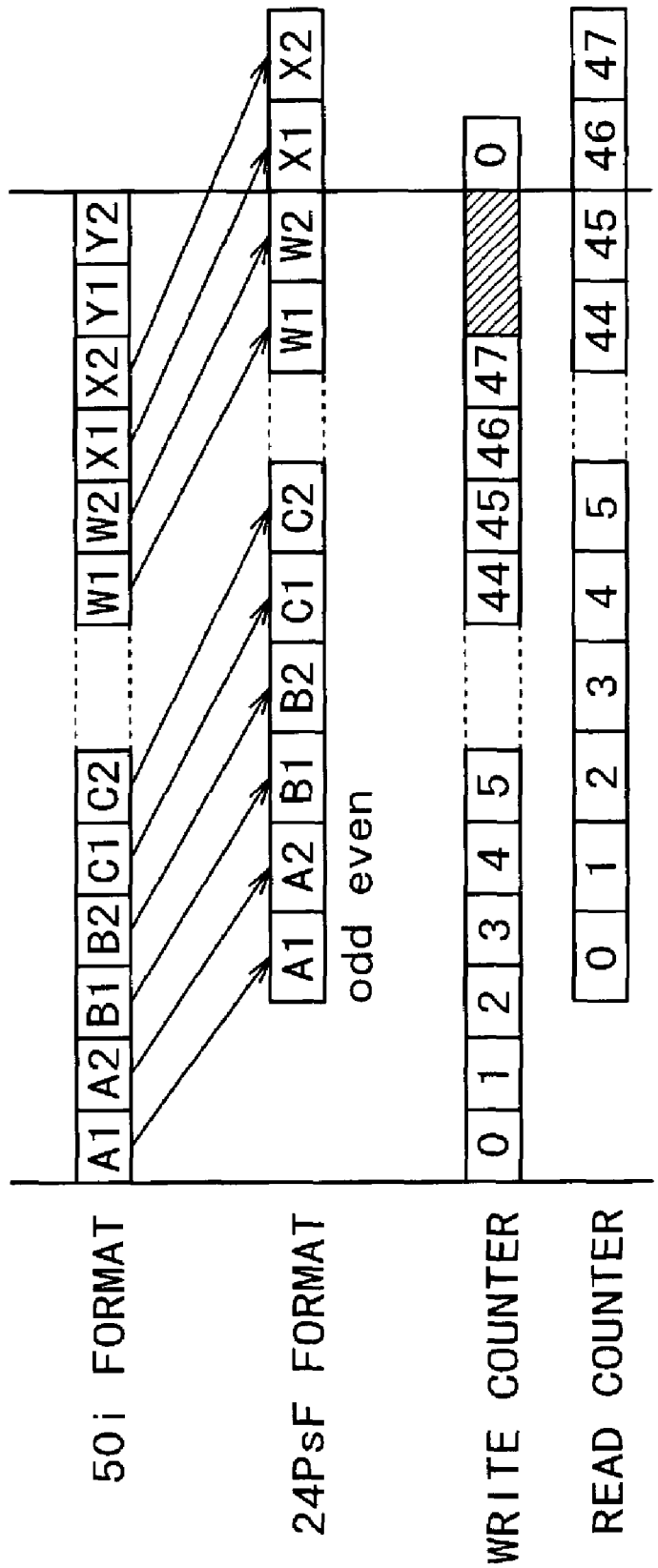
FIG. 3 illustrates frame conversion from a pure, not frame-converted video signal compliant with the 50i format into a video signal compliant with the 24 PsF format.

More specifically, as shown at the top row in FIG. 3, the CCU $20_1$ is supplied with a 50i format compliant pure video signal with no frame conversion applied, wherein the signal comprises fields "A1", "A2", "B1", "B2", "C1", "C2", . . . , "W1", "W2", "X1", "X2", "Y1", "Y2", and so on. The CCU $20_1$ then removes two consecutive fields "Y1" and "Y2" as shown at the second row from the top in FIG. 3. Finally, the CCU $20_1$ can generate a 24 PsF format compliant video signal comprising fields "A1", "A2", "B1", "B2", "C1", "C2", . . . , "W1", "W2", "X1", "X2", and so on in an alternate sequence of odd-numbered and even-numbered fields with the correct relation on the time axis.

In this manner, the multi-format camera system applies the frame conversion based on the 2-3 pull down technique to a 60i format compliant video signal. The CCU $20_1$ performs the normal reverse frame conversion for the signal to generate a 24P-type format compliant video signal comprising fields that maintain the correct relation on the time axis. On the other hand, the CCU $20_1$ performs the frame conversion for a 60i format compliant pure video signal with no frame conversion applied by skipping fields in units of frames in accordance with the conversion ratio as mentioned above. Thus, it is possible to generate a 24P-type format compliant video signal comprising fields having the correct relation on the time axis. A multi-format system provides two frame conversions including a frame conversion that converts a 60i-type format compliant video signal into a 24 PsF format compliant video signal. The CCU $20_2$ is configured so as to be able to selectively change one of two frame conversions according to 60i format video signals supplied to the CCU $20_1$.

The following describes in detail a specific configuration of the CCU $20_1$ that performs these processes. In the description to follow, it is assumed that the multi-format video camera $10_1$ operates in the 24P-type format and the return signal $RET_1$ is a 60i-type format compliant video signal.

Figure 4:
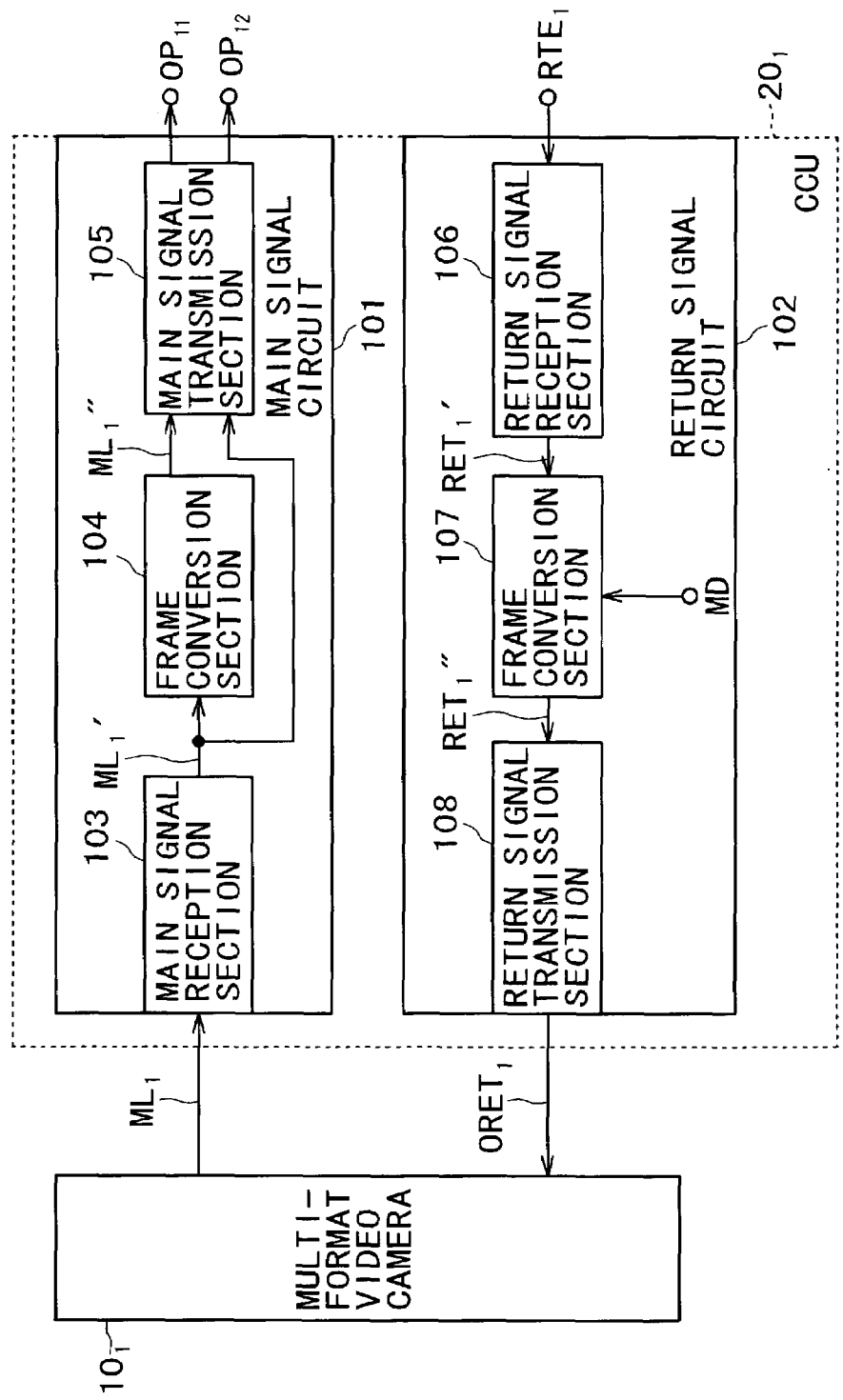
FIG. 4 is a block diagram showing a configuration of a CCU provided in the multi-format camera system according to the embodiment of the present invention.

As shown in FIG. 4, for example, the CCU $20_1$ comprises a main signal circuit 101 and a return signal circuit 102. The main signal circuit 101 processes a 24P-type format compliant video signal $ML_1$ as a main signal transmitted from the multi-format video camera $10_1$ via the optical fiber cable $90_1$. The return signal circuit 102 processes the return signal $RET_1$ as a 60 i-type format compliant video signal transmitted from the switcher $40_2$ via the HD-SDI compliant serial bus and the like.

The main signal circuit 101 comprises a main signal reception section 103, a frame conversion section 104, and a main signal transmission section 105. The main signal reception section 103 receives the video signal $ML_1$. The frame conversion section 104 applies frame conversion to the video signal $ML_1'$ received by the main signal reception section 103. The main signal transmission section 105 transmits either or both of a video signal $ML_1''$ frame-converted by the frame conversion section 104 and the video signal $ML_1'$ that is directly supplied from the main signal reception section 103 and is not frame-converted by the frame conversion section 104.

The main signal reception section 103 receives the 24P-type format compliant video signal $ML_1$ as serial data transmitted from the multi-format video camera $10_1$ via the optical fiber cable $90_1$. The main signal reception section 103 then converts the video signal $ML_1$ as an optical signal into an electric signal by performing the optical electric conversion (O/E conversion). Further, the main signal reception section 103 converts the video signal into parallel data by performing the serial-parallel conversion. The main signal reception section 103 supplies the generated video signal $ML_1'$ as parallel data to the frame conversion section 104 or the main signal transmission section 105.

When the main signal reception section 103 supplies the video signal $ML_1'$ as 24P-type format compliant parallel data, the frame conversion section 104 applies the frame conversion based on the 2-3 pull down technique to the video signal $ML_1'$ and converts this signal into the 60i-type format compliant video signal $ML_1''$. The frame conversion section 104 supplies the generated video signal $ML_1''$ to the main signal transmission section 105.

The frame conversion section 104 supplies the video signal $ML_1''$ as 60i-type format compliant parallel data. The main signal reception section 103 supplies the video signal $ML_1'$ as 24P-type format compliant parallel data. The main signal transmission section 105 applies parallel-serial conversion to either or both the video signals $ML_1''$ and $ML_1'$ for conversion into serial data. The main signal transmission section 105 transmits the generated 24P-type format compliant serial data as the video signal $OP_{11}$ to the switcher $40_1$ via the HD-SDI compliant serial bus and the like. The main signal transmission section 105 transmits the generated 60i-type format compliant serial data as the video signal $OP_{12}$ to the switcher $40_1$ via the HD-SDI compliant serial bus and the like.

The return signal circuit 102 comprises a return signal reception section 106, a frame conversion section 107, and a return signal transmission section 108. The return signal reception section 106 receives the return signal $RET_1$. The frame conversion section 107 performs frame conversion for a video signal as the return signal $RET_1$ received by the return signal reception section 106. The return signal transmission section 108 transmits a video signal frame-converted by the frame conversion section 107 as a return signal $ORET_1$.

The return signal reception section 106 receives the 60 i-type format compliant return signal $RET_1$ as serial data transmitted from the outside via the switcher $40_2$. The return signal reception section 106 converts the return signal $RET_1$ into parallel data by performing the serial-parallel conversion. The return signal reception section 106 then supplies a video signal $RET_1'$ as the generated parallel data to the frame conversion section 104 or the main signal transmission section 105.

The frame conversion section 107 applies the frame conversion to the video signal $RET_1'$ as the 60i-type format compliant parallel data supplied from the return signal reception section 106. At this time, the frame conversion section 107 selects one of the above-mentioned two frame conversions in accordance with an externally supplied mode signal MD to change the method of frame conversions. An example of the mode signal MD is a control signal transmitted to the CCU $20_1$ via the optical fiber cable $90_1$ in accordance with an operation for changing the frame conversion method when an imaging user operates the multi-format video camera $10_1$ and monitors a video signal as the return signal $ORET_1$. Another example thereof is a control signal generated in accordance with an operation for changing the frame conversion method by an operator of the CCU $20_1$. When the frame conversion is performed to generate the 24P-type format compliant video signal $RET_1''$ the frame conversion section 107 supplies this signal to the return signal transmission section 108.

When the frame conversion section 107 supplies the video signal $RET_1''$ as 24P-type format compliant parallel data, the return signal transmission section 108 converts this signal into serial data by performing the parallel-serial conversion. The return signal transmission section 108 further converts the video signal as an electric signal into an optical video signal by performing electric optical conversion (E/O conversion). The generated video signal is 24P-type format compliant serial data. The return signal transmission section 108 transmits this video signal as the return signal $ORET_1$ to the multi-format video camera $10_1$ via the optical fiber cable $90_1$.

In the CCU $20_1$, the main signal circuit 101 performs the frame conversion for the 24P-type format compliant video signal $ML_1$ as the main signal. The return signal circuit 102 performs the frame conversion for the 60i-type format compliant return signal $RET_1$. The frame conversion section 107 can perform the frame conversion for the return signal $RET_1$ by controlling operations to write or read data from storage elements, for example.

Figure 5:
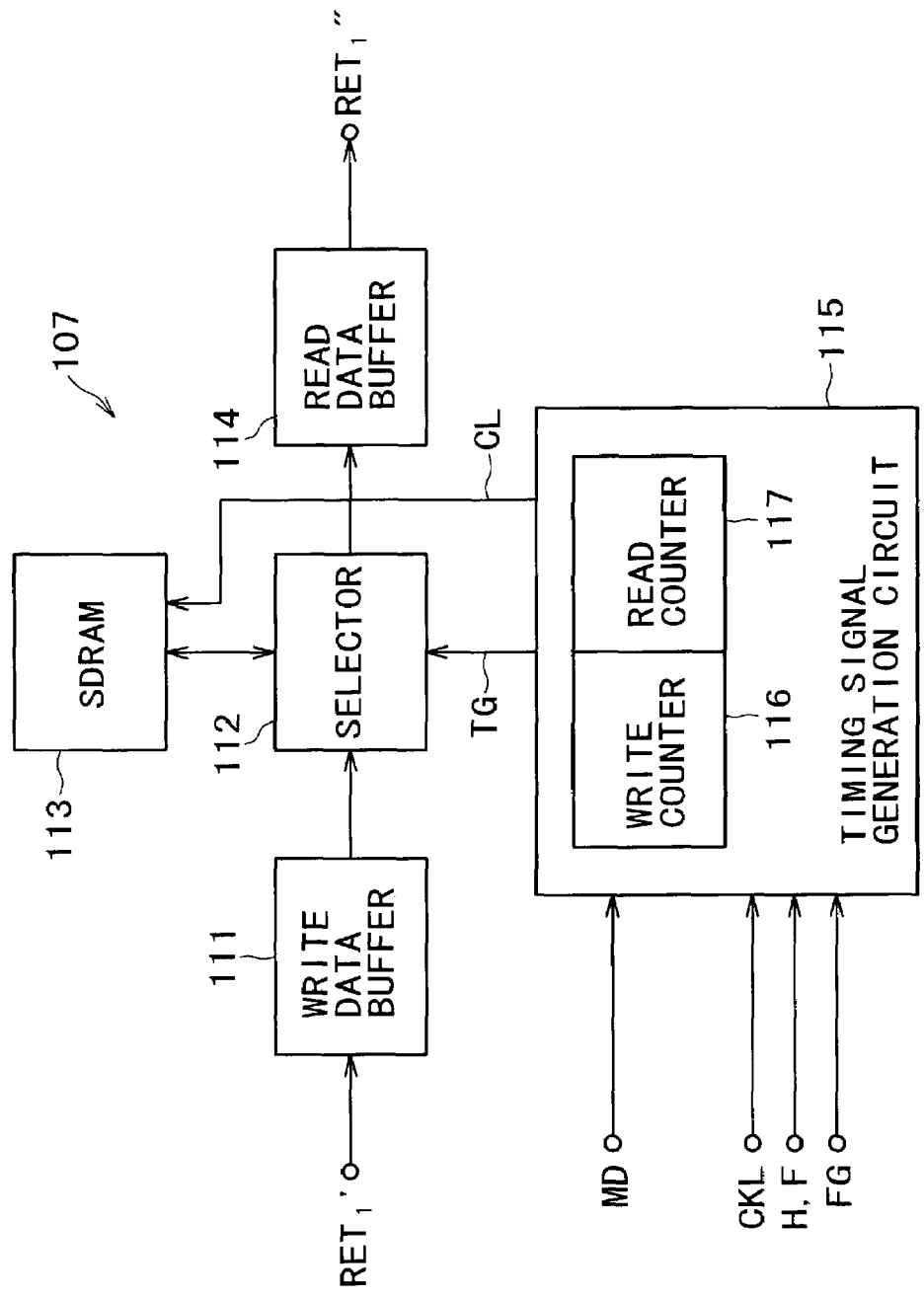
FIG. 5 is a block diagram showing a configuration of a frame conversion section provided for the CCU in FIG. 4.

As shown in FIG. 5, for example, the frame conversion section 107 comprises a write data buffer 111, a selector 112, SDRAM 113, a read data buffer 114, and a timing signal generation circuit 115. The write data buffer 111 temporarily stores the 60 i-type format compliant video signal $RET_1'$ that is parallel data supplied from the return signal reception section 106 and is separated into a brightness signal (Y) and a color signal (C). The selector 112 selects either of operations for writing data stored in the write data buffer 11 to the SDRAM (Synchronous Dynamic Random Access Memory) 113 to be described and for reading data stored as write data in the SDRAM 113. The SDRAM 113 stores write data that is read from the write data buffer 111 and is supplied to the selector 112. The read data buffer 114 temporarily stores the read data that is read from the SDRAM 113 and is supplied via the selector 112. The timing signal generation circuit 115 generates a timing signal TG to control the selector 112 and a control signal CL to control operations to write or read data from the SDRAM 113.

For interface with the SDRAM 113, the write data buffer 111 temporarily stores the 60i-type format compliant video signal $RET_1'$ as parallel data, e.g., having a 20-bit width supplied from the return signal reception section 106. The write data buffer 111 converts this signal into write data having a 60-bit width, for example. The write data stored in the write data buffer 111 is supplied to the SDRAM 113 via the selector 112.

Based on the timing signal TG supplied from the timing signal generation circuit 115, the selector 112 selects an operation of writing data stored in the write data buffer 111 to the SDRAM 113 or an operation of reading the data stored in the SDRAM 113 and supplying the read data to the read data buffer 114.

Based on the control signal CL supplied from the timing signal generation circuit 115, the SDRAM 113 stores the write data that is read from the write data buffer 111 and is supplied via the selector 112. Based on the control signal CL supplied from the timing signal generation circuit 115, the write data stored in the SDRAM 113 is read as 60-bit wide read data and is supplied to the read data buffer 114 via the selector 112.

The read data buffer 114 temporarily stores the 60-bit wide read data that is read from the SDRAM 113 and is supplied via the selector 112, and converts the data into 20-bit wide read data. The read data stored in the read data buffer 114 is supplied to the return signal transmission section 108 as the 24P-type format compliant video signal $RET_1''$.

The timing signal generation circuit 115 is supplied with the above-mentioned mode signal MD for determining the frame conversion method; a clock CLK extracted from the video signal $RET_1'$; a horizontal synchronization signal H; a frame signal F; and a frame gate signal FG for indicating the start position of the frame conversion. The timing signal generation circuit 115 comprises a write counter 116 used for writing data to the SDRAM 113 and a read counter 117 used for reading data from the SDRAM 113. The timing signal generation circuit 115 operates the write counter 116 and the read counter 117 when supplied with the clock CLK, the horizontal synchronization signal H, the frame signal F, and the frame gate signal FG. The timing signal generation circuit 115 generates the timing signal TG and the control signal CL based on these count values. At this time, the timing signal generation circuit 115 changes operations of the write counter 116 and the read counter 117 in accordance with the mode signal MD as will be discussed in more detail below.

To perform the frame conversion, the frame conversion section 107 allows the selector 112 to alternately write and read data from the SDRAM 113 using the write data buffer 111 and the read data buffer 114. The frame conversion section 107 selectively changes the above-mentioned frame conversions by controlling reading and writing data to and from the SDRAM 113 in accordance with the mode signal MD input to the timing signal generation circuit 115.

For example, the mode signal MD is supplied to the timing signal generation circuit 115 to indicate that the return signal $RET_1$ is a 60 i-type format compliant video signal with the frame conversion applied on the basis of the 2-3 pull down technique. In order to perform a normal reverse frame conversion corresponding to the frame conversion, the frame conversion section 107 continuously operates the write counter 116 correspondingly to each field to write data to the SDRAM 113. In addition, the frame conversion section 107 intermittently operates the read counter 117 by skipping the count values for a time period corresponding to fields not read as the read data from the SDRAM 113. In this manner, the frame conversion section 107 reads specified data as read data out of the data written to the SDRAM 113. By contrast, the frame conversion section 107 intermittently operates the write counter 116 by skipping the count values for a time period corresponding to fields not written as the write data to the SDRAM 113. In this manner, the frame conversion section 107 retrieves only specified data input to the write data buffer 111 and writes the retrieved data as write data to the SDRAM 113. In addition, the frame conversion section 107 continuously operates the read counter 117 correspondingly to each field to read data from the SDRAM 113.

As another example, the mode signal MD is supplied to the timing signal generation circuit 115 to indicate that the return signal $RET_1$ is a 60i-type format compliant video signal with no frame conversion applied. In this case, the frame conversion section 107 operates the write counter 116 and the read counter 117 as shown in FIG. 2 or 3.

That is to say, the frame conversion section 107 skips two fields per ten fields when converting a 60i format compliant pure video signal with no frame conversion applied into a 24 PsF format compliant video signal. As shown in the third and fourth rows in FIG. 2, the frame conversion section 107 increments the write counter 116 and the read counter 117 at intervals of eight fields. While the frame conversion section 107 increments the write counter 116 from the count values "0" to "7", there is provided a pause period equivalent to two counts corresponding to two fields to be skipped as indicated by a shaded portion in FIG. 2. The frame conversion section 107 increments the read counter 117 continuously from the count values "0" to "7". In FIG. 2, the write counter 116 pauses for the last two counts in a cycle to skip fields "Eo" and "Ee". As long as the write counter 116 pauses for two consecutive counts to skip fields in units of frames, it may pause at any point in the cycle. In this case, the operating frequency of the write counter 116 is higher than that of the read counter 117. Accordingly, it is obvious that the count value of the read counter 117 does not overtake that of the write counter 116.

On the other hand, the frame conversion section 107 skips two fields per 50 fields when converting a 50i format compliant pure video signal with no frame conversion applied into a 24 PsF format compliant video signal. As shown in the third and fourth rows in FIG. 3, the frame conversion section 107 increments the write counter 116 and the read counter 117 at intervals of 48 fields. While the frame conversion section 107 increments the write counter 116 from the count values "0" to "47", there is provided a pause period equivalent to two counts corresponding to two fields to be skipped as indicated by a shaded portion in FIG. 3. The frame conversion section 107 increments the read counter 117 continuously from the count values "0" to "47". In FIG. 3, the write counter 116 pauses for the last two counts in a cycle to skip fields "Y1" and "Y2". As long as the write counter 116 pauses for two consecutive counts to skip fields in units of frames, it may pause at any point in the cycle. In this case, the operating frequency of the write counter 116 is higher than that of the read counter 117 as mentioned above. Accordingly, it is obvious that the count value of the read counter 117 does not overtake that of the write counter 116.

In this manner, the frame conversion section 107 varies operations of the write counter 116 and the read counter 117 corresponding to the mode signal MD supplied to the timing signal generation circuit 115. The frame conversion section 107 generates the timing signal TG based on the count values to operate the selector 112. The frame conversion section 107 generates the control signal CL based on the count values to control operations of writing and reading data from the SDRAM 113. This makes it possible to selectively switching between two frame conversions. Consequently, the $CCU\ 20_1$ having this frame conversion section 107 can properly change frame conversion methods in accordance with a video signal supplied as the return signal $RET_1$. The $CCU\ 20_1$ can generate a 24P-type format compliant video signal comprising fields that maintain the correct relation on the time axis.

There has bee described the changeover of frame conversion methods in accordance with manual operations by a user who operates the multi-format video camera $10_1$ for imaging or the $CCU\ 20_1$. The $CCU\ 20_1$ can automatically detect the type of a video signal supplied as the return signal $RET_1$ and automate the changeover of frame conversion methods accordingly. In order to perform the automatic changeover, the $CCU\ 20_1$ uses the periodicity of fields constituting a video signal input as the return signal $RET_1$.

Figure 6:
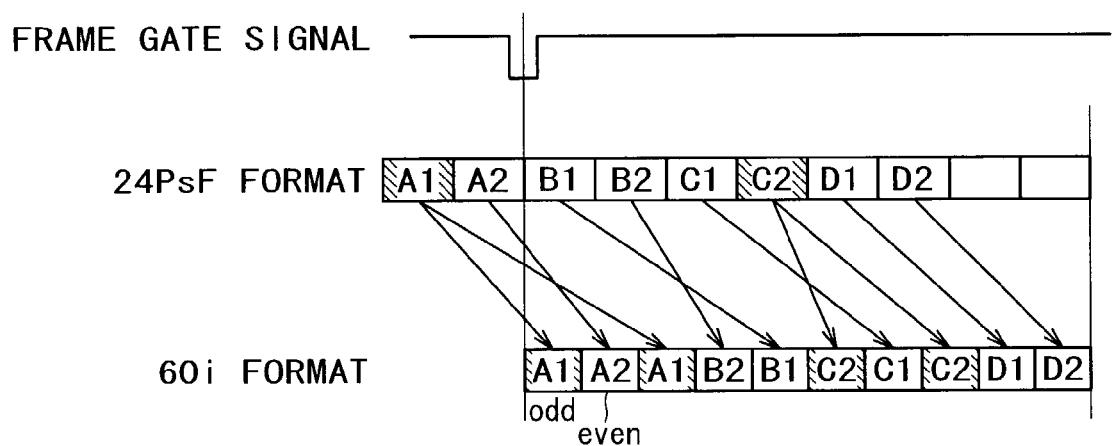
FIG. 6 illustrates frame conversion based on the 2-3 pull down technique from a video signal compliant with the 24 PsF format into a video signal compliant with the 60i format, wherein specified fields are duplicated as a result of the frame conversion.

The frame conversion based on the 2-3 pull down technique is performed for a 24 PsF format compliant video signal as shown at the middle in FIG. 6 with reference to the frame gate signal shown at the top of the same figure to obtain a 60i format compliant video signal. This signal comprises fields "A1", "A2", "A1", "B2", "B1", "C2", "C1", "C2", "D1", "D2", and so on in an alternate sequence of odd-numbered and even-numbered fields as shown at the bottom in FIG. 6.

As shown with shaded portions in FIG. 6, the field "A1" in the 24 PsF format compliant video signal repeatedly appears at the first and third fields in the frame-converted 60i format compliant video signal. Further, the field "C2" in the 24 PsF format compliant video signal repeatedly appears at the sixth and eighth fields in the frame-converted 60i format compliant video signal.

Figure 7:
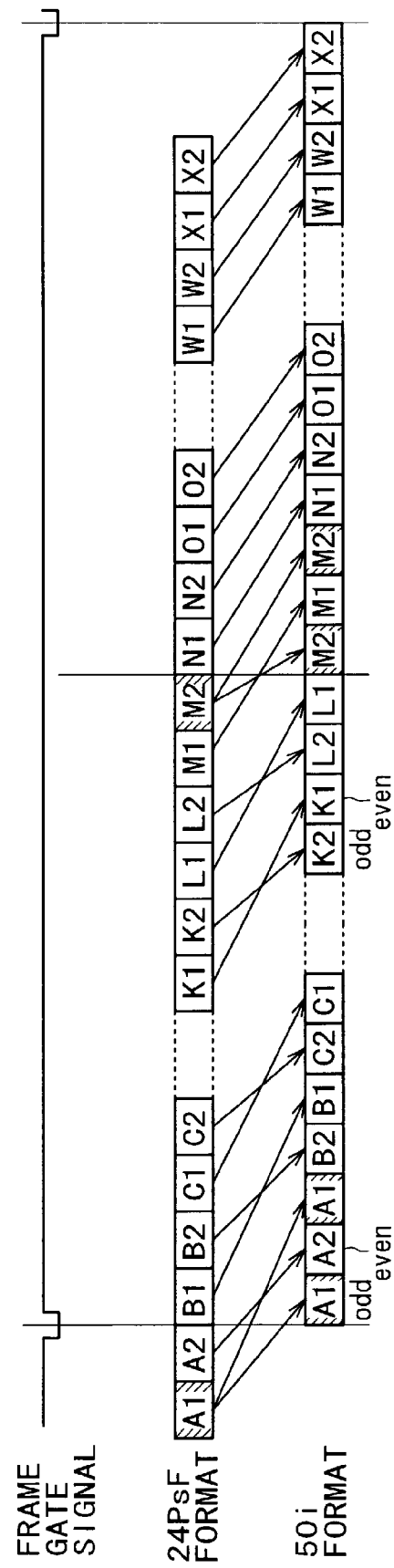
FIG. 7 illustrates frame conversion based on the 2-3 pull down technique from a video signal compliant with the 24 PsF format into a video signal compliant with the 50i format, wherein specified fields are duplicated as a result of the frame conversion.

The frame conversion based on the 2-3 pull down technique is performed for a 24 PsF format compliant video signal as shown at the middle in FIG. 7 with reference to the frame gate signal shown at the top of the same figure to obtain a 50i format compliant video signal. This signal comprises fields "A1", "A2", "A1", "B2", "B1", "C2", "C1", ..., "K2", "K1", "L2", "L1", "M2", "M1", "M2", "N1", "N2", "O1", "O2", ..., "W1", "W2", "X1", "X2", and so on in an alternate sequence of odd-numbered and even-numbered fields as shown at the bottom in FIG. 7.

As shown with shaded portions in FIG. 7, the field "A1" in the 24 PsF format compliant video signal repeatedly appears at the first and third fields in the frame-converted 50i format compliant video signal. Further, the field "M2" in the 24 PsF format compliant video signal repeatedly appears at the 26th and 28th fields in the frame-converted 50i format compliant video signal.

The frame conversion based on the 2-3 pull down technique is performed to obtain a 60i-type format compliant video signal in which a specific field appears repeatedly and periodically.

The $CCU\ 20_1$ detects the periodicity of field duplication to determine the type of a video signal supplied as the return signal $RET_1$. The $CCU\ 20_1$ can generate the mode signal MD according to a detection result and appropriately change the frame conversion methods.

Figure 8:
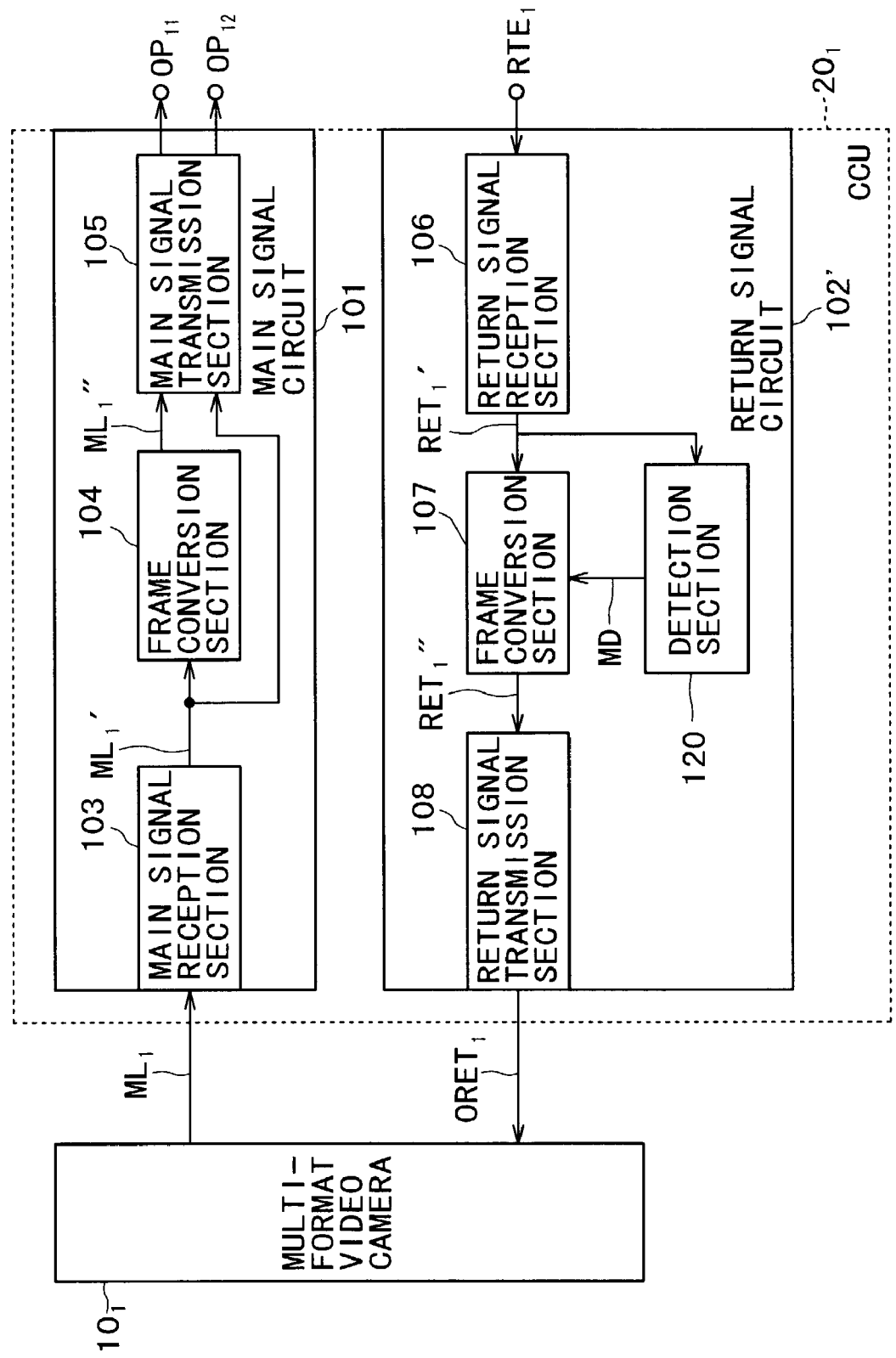
FIG. 8 is a block diagram showing another configuration of the CCU provided in the multi-format camera system according to the embodiment of the present invention.

The $CCU\ 20_1$ capable of the automatic changeover is configured as shown in FIG. 8, for example. The $CCU\ 20_1$ comprises a return signal circuit 102' containing a detection section 120 in place of the return signal circuit 102 shown in FIG. 4. The detection section 120 detects whether or not duplicated fields periodically appear in the 60i-type format compliant video signal $RET_1$' supplied from the return signal reception section 106.

The detection section 120 incorporates the video signal $RET_1$', i.e., 60i-type format compliant parallel data supplied from the return signal reception section 106 for each field and detects whether or not duplicate fields appear periodically.

Figure 9:
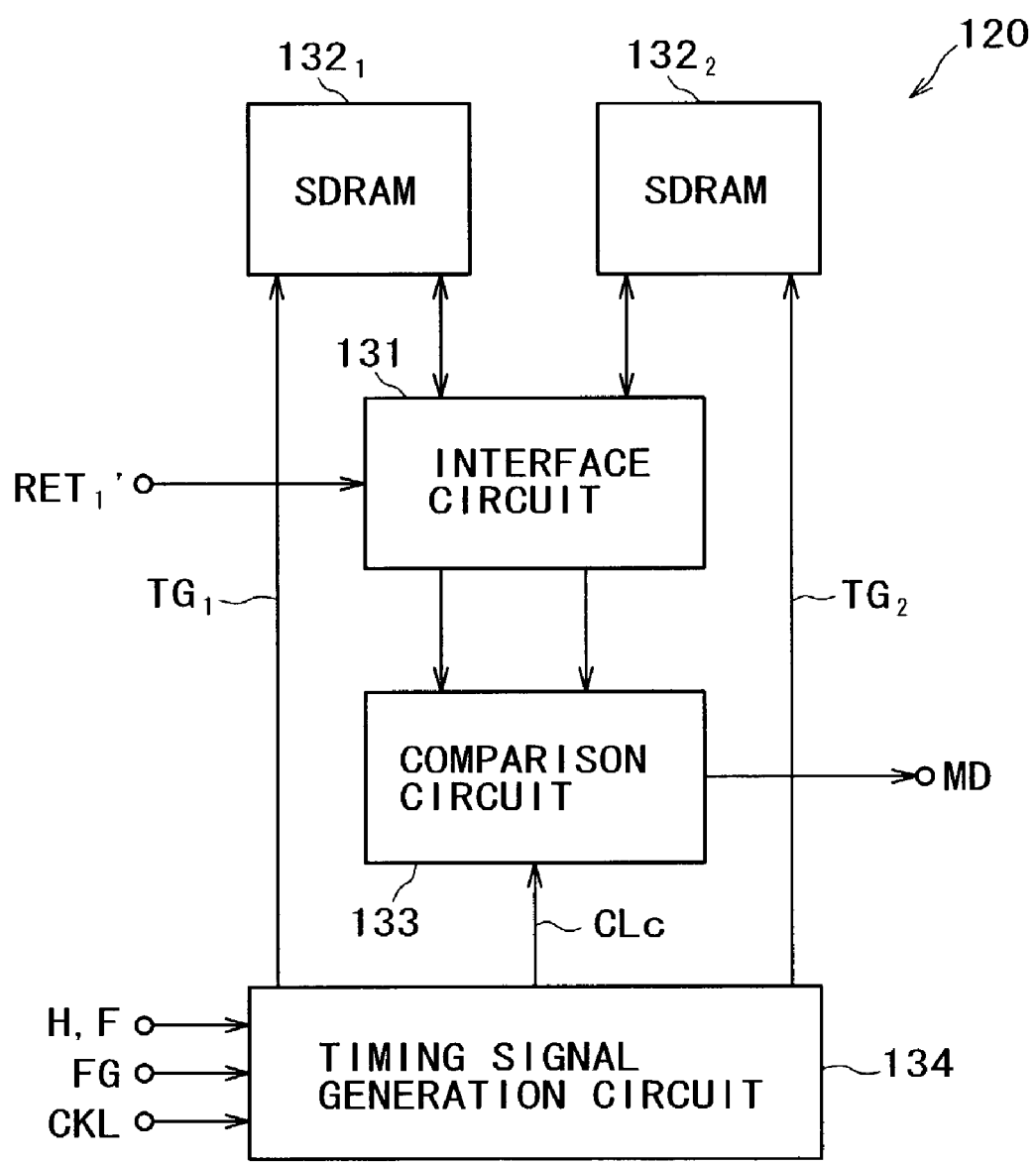
FIG. 9 is a block diagram showing a configuration of a detection section provided in the CCU in FIG. 8.
Figure 10:
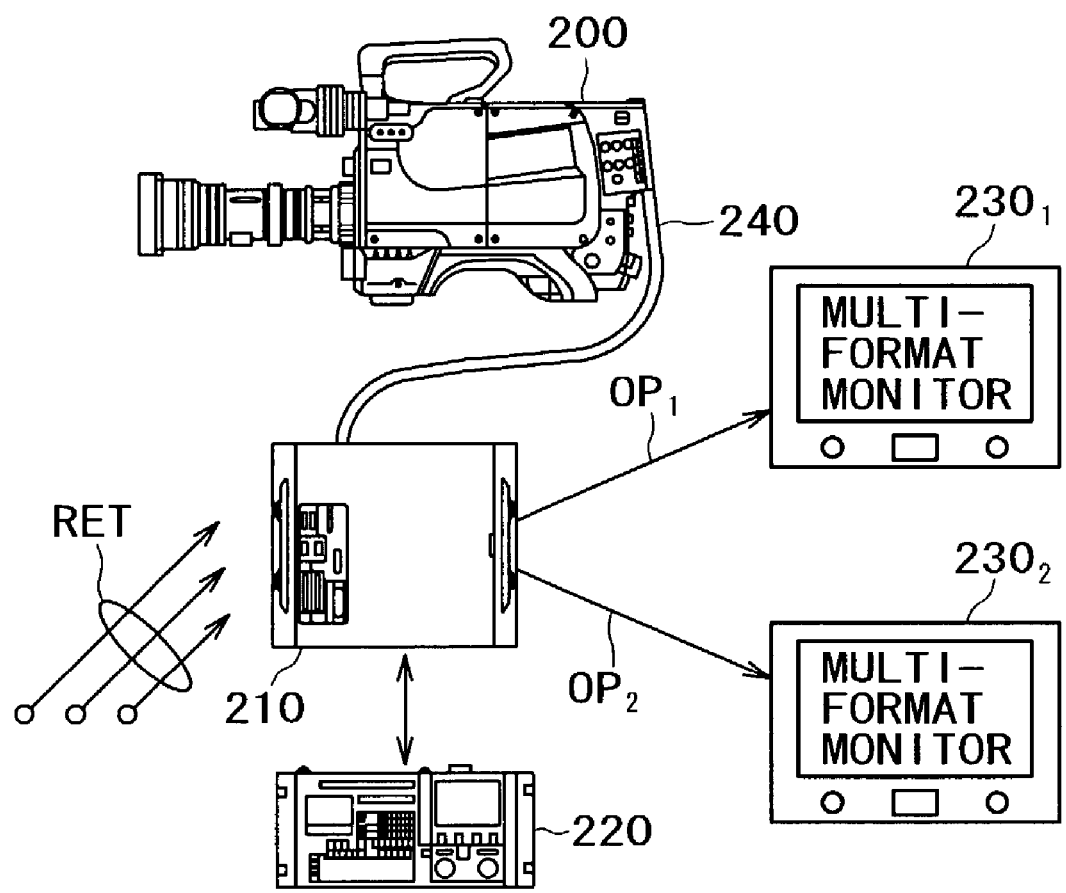
FIG. 10 illustrates a configuration of the multi-format camera system.
Figure 11:
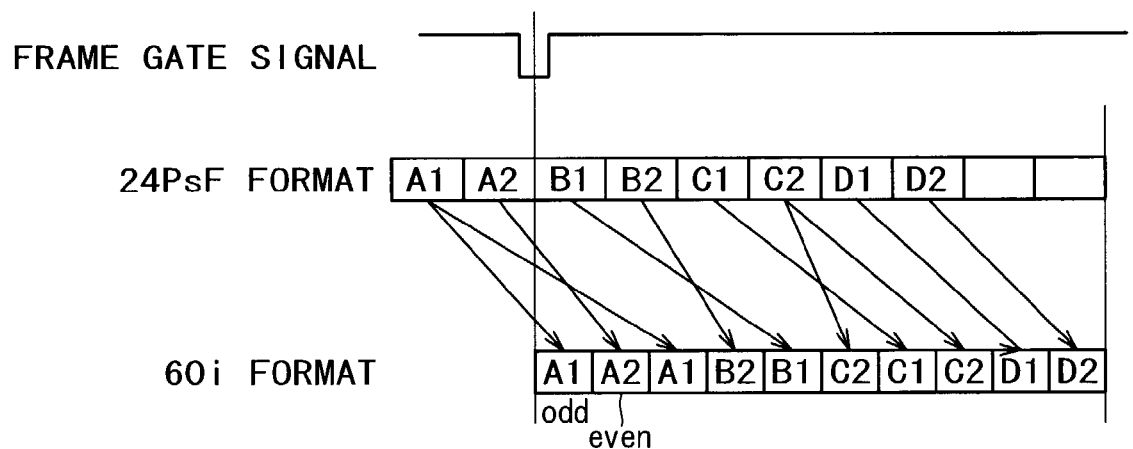
FIG. 11 illustrates frame conversion based on the 2-3 pull down technique from a video signal compliant with the 24 PsF format into a video signal compliant with the 60 i format.
Figure 12:
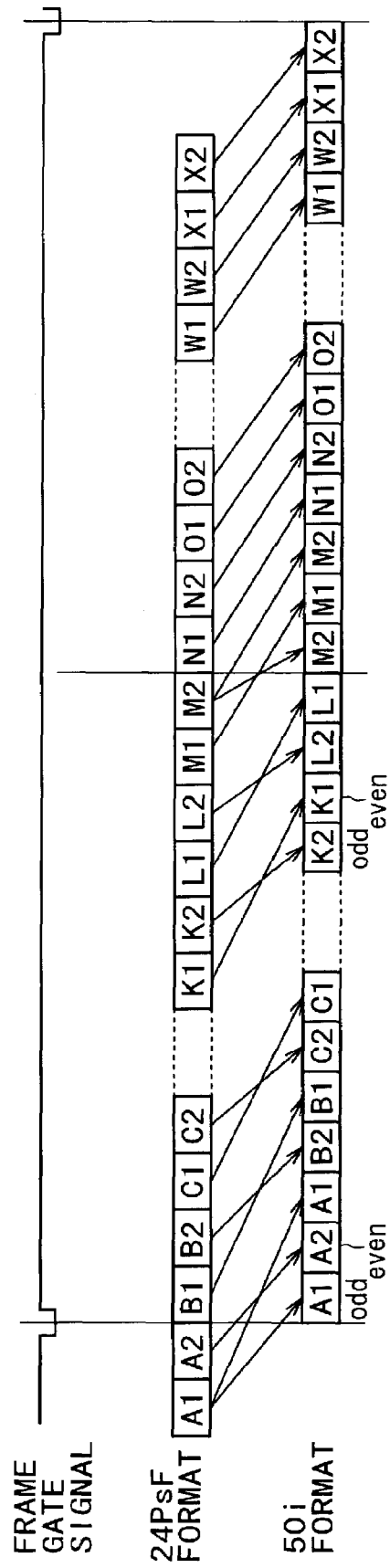
FIG. 12 illustrates frame conversion based on the 2-3 pull down technique from a video signal compliant with the 24 PsF format into a video signal compliant with the 50i format.
Figure 13:
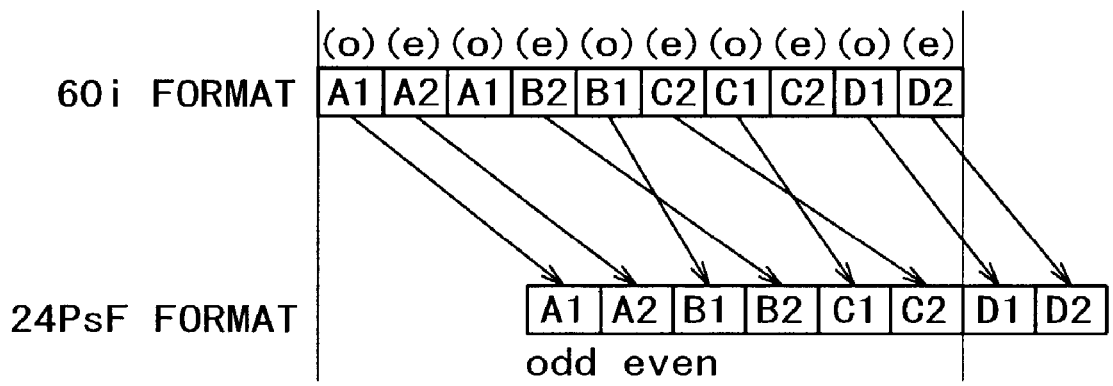
FIG. 13 illustrates reverse frame conversion from a video signal compliant with the 60i format subject to the same conversion as the frame conversion based on the 2-3 pull down technique as shown in FIG. 11 into a video signal compliant with the 24 PsF format.
Figure 14:
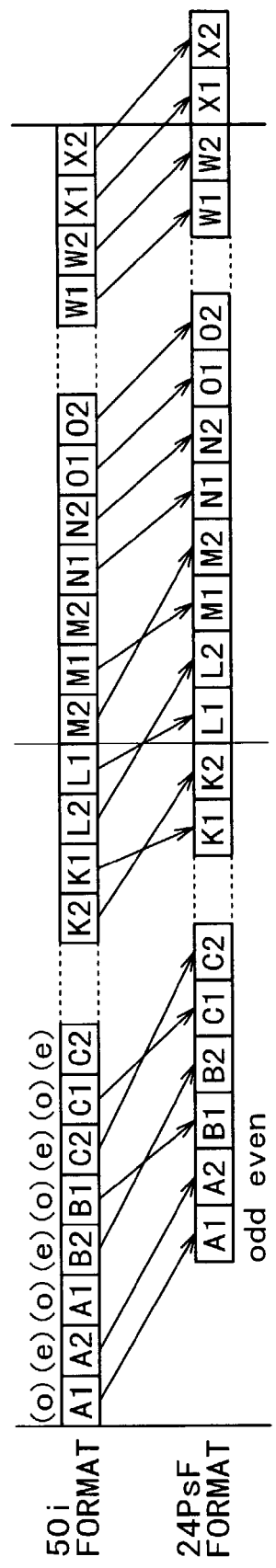
FIG. 14 illustrates reverse frame conversion from a video signal compliant with the 50i format subject to the same conversion as the frame conversion based on the 2-3 pull down technique as shown in FIG. 11 into a video signal compliant with the 24 PsF format.
Figure 15:
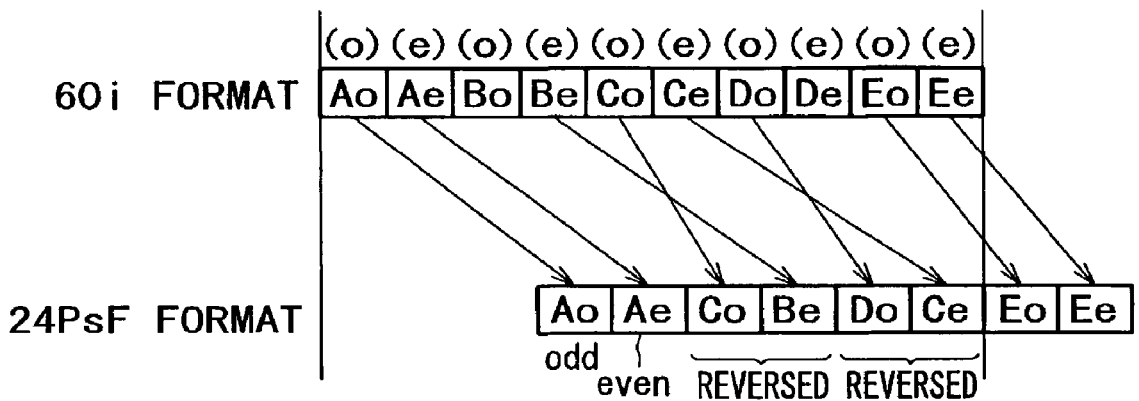
FIG. 15 illustrates the same reverse conversion as the reverse frame conversion as shown in FIG. 13 from a pure, not frame-converted video signal compliant with the 60i format into a video signal compliant with the 24 PsF format.
Figure 16:
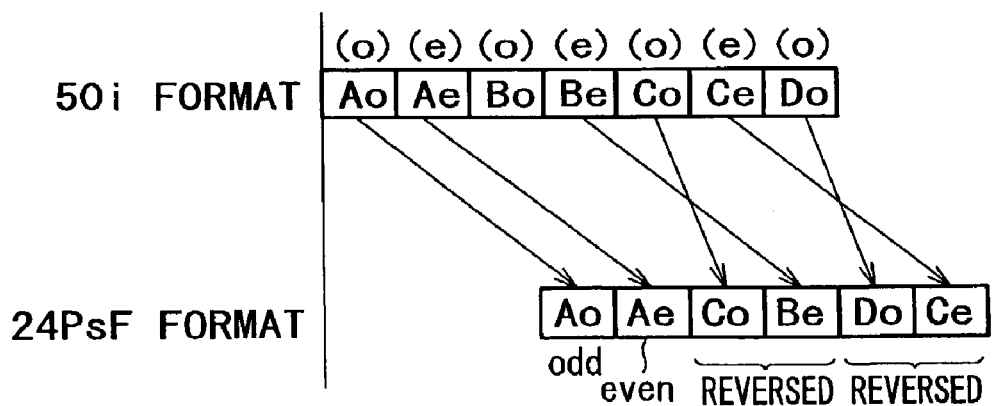
FIG. 16 illustrates the same reverse conversion as the reverse frame conversion as shown in FIG. 14 from a pure, not frame-converted video signal compliant with the 50i format into a video signal compliant with the 24 PsF format.

More specifically, as shown in FIG. 9, the detection section 120 comprises, e.g., an interface circuit 131, two SDRAMs $132_1$ and $132_2$, a comparison circuit 133, and a timing signal generation circuit 134. The interface circuit 131 reads and writes the 60i-type format compliant video signal $RET_1$' to and from two SDRAMs $132_1$ and $132_2$ to be described, wherein the video signal $RET_1$' is parallel data supplied from the return signal reception section 106 and is separated into a brightness signal (Y) and a color signal (C). The two SDRAMs $132_1$ and $132_2$ store field-based data supplied via the interface circuit 131. The comparison circuit 133 compares two pieces of data with each other that are read from the two SDRAMs $132_1$ and $132_2$ and are supplied via the interface circuit 131. The timing signal generation circuit 134 generates timing signals $TG_1$ and $TG_2$ to control data write and read operations for the SDRAMs $132_1$ and $132_2$ respectively and a control signal $CL_c$ to control the comparison circuit 133.

The interface circuit 131 is configured similarly to the write data buffer 111, the selector 112, and the read data buffer 114 shown in FIG. 5. The interface circuit 131 writes and reads the video signal $RET_1$' to and from the SDRAMs $132_1$ and $132_2$.

The SDRAM $132_1$ stores the first field data in the video signal $RET_1$' supplied via the interface circuit 131 based on the timing signal $TG_1$ supplied from the timing signal generation circuit 134. The data stored in the SDRAM $132_1$ is read based on the timing signal $TG_1$ supplied from the timing signal generation circuit 134 and is supplied to the comparison circuit 133 via the interface 131.

The SDRAM $132_2$ stores the third field data, i.e., data for a field adjacent to another field next to the first field stored in the SDRAM $132_1$, in the video signal $RET_1$' supplied via the interface circuit 131 based on the timing signal $TG_2$ supplied from the timing signal generation circuit 134. The data stored in the SDRAM $132_2$ is read based on the timing signal $TG_2$ supplied from the timing signal generation circuit 134 and is supplied to the comparison circuit 133 via the interface 131.

Based on the control signal $CL_c$ supplied from the timing signal generation circuit 134, the comparison circuit 133 compares data comprising two fields supplied from the SDRAMs $132_1$ and $132_2$ via the interface circuit 131. The comparison circuit 133 supplies the frame conversion section 107 with a comparison result in the form of the mode signal MD.

The timing signal generation circuit 134 is supplied with the clock CLK extracted from the video signal $RET_1$'; the horizontal synchronization signal H; the frame signal F; and the frame gate signal FG for indicating the start position of the frame conversion. When supplied with the clock CLK, the horizontal synchronization signal H, the-frame signal F, and the frame gate signal FG, then based on these signals, the timing signal generation circuit 134 generates the timing signals $TG_1$ and $TG_2$ and the control signal $CL_c$. The timing signal generation circuit 134 supplies the generated timing signals $TG_1$ and $TG_2$ to the SDRAMs $132_1$ and $132_2$ respectively and supplies the control signal $CL_c$ to the comparison circuit 133.

The detection section 120 stores the first field data of the video signal $RET_1$' in the SDRAM $132_1$, stores the third field data thereof in the SDRAM $132_2$, and uses the comparison circuit 133 to compare the two pieces of data with each other. The detection section 120 detects whether or not the same field appears in duplicate like two fields "A1" shown at the bottom in FIG. 6. When the video signal $RET_1$' complies with the 60i format, the detection section 120 stores the sixth field data in the SDRAM $132_1$ and the eighth field data in the SDRAM $132_2$, and uses the comparison circuit 133 to compare the two pieces of data. When the video signal $RET_1$' complies with the 50i format, the detection section 120 stores the 26th field data in the SDRAM $132_1$ and the 28th field data in the SDRAM $132_2$, and uses the comparison circuit 133 to compare the two pieces of data. If the comparison circuit 133 shows a comparison result that the same field appears in duplicate periodically, the detection section 120 determines that the return signal $RET_1$ is a 60i-type format compliant video signal generated by the frame conversion based on the 2-3 pull down technique. The detection section 120 then generates the mode signal MD reflecting this information. If the comparison circuit 133 shows a comparison result that the same field does not appear in duplicate periodically, the detection section 120 determines that the return signal $RET_1$ is a 60i-type format compliant pure video signal with no frame conversion applied. The detection section 120 then generates the mode signal MD reflecting this information.

The CCU $20_1$ having such detection section 120 can detect the type of a video signal supplied as the return signal $RET_1$ according to the periodicity field duplication. The CCU $20_1$ can generate a 24P-type format compliant video signal comprising fields that maintain the correct relation on the time axis by appropriately changing two frame conversions in accordance with the mode signal MD corresponding to this detection result. Accordingly, the CCU $20_1$ can save labor in manually setting modes and prevent inadvertent settings due to manual operations.

While there has been described the detection section 120 that detects the periodicity of field duplication, the detection section 120 itself just needs to detect the presence or absence of field duplication without going so far as to detect the periodicity. If it is possible to determine the type of a video signal supplied as the return signal $RET_1$, it may be preferable to determine which frame conversion should be applied when the field duplication is detected. Thus, the CCU $20_1$ can shorten the time for mode setting.

In the detection section 120, supplying the frame gate signal FG does not need to trigger storage of fields in the SDRAM $132_1$. Even if no frame gate signal FG is supplied, it is possible to detect the periodicity of field duplication by comparing two fields of data one field after another as mentioned above. In this case, the detection section 120 just needs to detect the periodicity of field duplication at least for a period capable of finding the periodicity in accordance with the frame conversion. For example, the detection just needs to be performed for at least eight fields when the video signal $RET_1$' complies with the 60i format or for at least 28 fields when the video signal $RET_1$' complies with the 50 i format.

As mentioned above, the multi-format camera system according to the embodiment provides a normal reverse frame conversion corresponding to the frame conversion based on the 2-3 pull down technique and a frame conversion by skipping fields in units of frames in accordance with the conversion ratio. It is possible to selectively change these two frame conversions in accordance with the mode signal MD. When the CCU is supplied with a 60i-type format video signal as a return signal processed by the frame conversion based on the 2-3 pull down technique, the multi-format camera system applies a normal reverse frame conversion to this video signal. When the CCU is supplied with a 60i-type format compliant pure video signal with no frame conversion applied, the multi-format camera system applies the frame conversion to this video signal by skipping fields in units of frames. In this manner, it is possible to apply an appropriate frame conversion to the video signal input as a return signal. Consequently, the multi-format camera system can generate 24P-type format compliant video signals comprising fields maintaining the correct relation on the time axis with decreased uncomfortable feeling and free from anomalies and flexibly comply with various systems.

The present invention is not limited to the above-mentioned embodiment. For example, the above-mentioned embodiment has described the conversion of a 60i-type format compliant video signal into a 24P-type format compliant video signal. When the pull down function is performed in units of fields, and formats are converted from a high frame rate to a low frame rate, however, the present invention can be applied to any of conversions from the i-type format into the i-type format, from the P-type format into the P-type format, from the P-type format into the i-type format, and from the i-type format into the P-type format.

The above-mentioned embodiment has described that a reverse frame conversion is applied to video signals processed by the frame conversion based on the 2-3 pull down technique. Further, the present invention can be easily applied to not only video signals based on the 2-3 pull down technique, but also those processed by various frame conversions such as a so-called 3-2 pull down technique.

Moreover, the embodiment has been described through the use of the CCU in the multi-format camera system. Obviously, the present invention can be also applied to stand-alone apparatuses such as a frame conversion board that can perform the similar frame conversion.

Furthermore, the embodiment has described that the frame gate signal indicates the start position of the frame conversion. The frame gate signal just needs to indicate any reference instead of the start position of the frame conversion.

While the embodiment processes return signals, it is obvious that the present invention can be applied to any video signals other than the return signals. That is to say, the present invention can be applied to not only camera systems such as the multi-format camera system, but also various technical fields that require frame conversions.

It is to be distinctly understood that the present invention may be otherwise variously embodied within the spirit and scope of the invention.

What is claimed is:

1. A frame conversion apparatus to convert a first video signal into a second video signal, comprising:
    a signal input means for inputting a first video signal having a first frame rate;
    a frame conversion means for selecting either a first conversion or a second conversion in accordance with said first video signal and for converting the first video signal using the selected conversion into a second video signal having a second frame rate that is lower than the first frame rate,
    wherein the frame conversion means selects the first conversion when the first video signal is a result of a frame conversion of a video signal having the second frame rate based on a 2-3 pull down technique into the first video signal, the first conversion being a frame conversion with a reverse 2-3 pull down technique, and
    wherein the frame conversion means selects the second conversion when the first video signal is a pure video signal, said second conversion being a frame conversion by means of a frame-based skip process according to a conversion ratio, the conversion ratio being a ratio between said second frame rate and said first frame rate; and
    a signal output means for outputting said second video signal generated by said frame conversion means.

2. The frame conversion apparatus according to claim 1, wherein said frame conversion means applies said first conversion to said first video signal when said first video signal is generated by performing the same frame conversion as said frame conversion; and
    said frame conversion means applies said second conversion to said first video signal when said frame conversion is not applied to said first video signal.

3. The frame conversion apparatus according to claim 1, wherein said frame conversion means selectively changes said first conversion and said second conversion in accordance with a mode signal to select one of said first conversion and said second conversion.

4. The frame conversion apparatus according to claim 3, wherein said frame conversion means further comprises:
    a storage means for storing said input first video signal; and
    a control means for controlling operations of writing and reading a video signal to and from said storage means, and
    wherein said control means selectively changes said first conversion and said second conversion by changing operations of writing and reading a video signal to and from said storage means in accordance with said mode signal.

5. The frame conversion apparatus according to claim 4, wherein said control means comprises:
    a write count means for counting count values used for writing said first video signal to said storage means; and
    a read count means for counting count values used for reading video signals stored in said storage means, and
    wherein said control means changes operations of said write count means and said read count means in accordance with said mode signal.

6. The frame conversion apparatus according to claim 5, wherein, when said frame conversion is not applied to said first video signal, said control means provides said write count means with a pause period equivalent to a count corresponding to fields to be skipped while incrementing a count value and allows said read count means to continuously increment a count value.

7. The frame conversion apparatus according to claim 1 further comprising:
    a detection means for detecting a type of said first video signal in accordance with the presence or absence of duplicate fields constituting said first video signal,
    wherein said frame conversion means selectively changes said first conversion and said second conversion in accordance with a type of said first video signal determined on the basis of a detection result of said detection means.

8. The frame conversion apparatus according to claim 7, wherein said detection means detects the presence or absence of periodicity of duplicate fields constituting said first video signal.

9. The frame conversion apparatus according to claim 7, wherein said detection means has a comparison means for comparing two of fields constituting said first video signal.

10. The frame conversion apparatus according to claim 7, wherein said detection means generates a mode signal according to said detection result to select either of said first conversion and said second conversion; and said frame conversion means selectively changes said first conversion and said second conversion according to said mode signal.

11. A frame conversion method of converting a first video signal into a second video signal, said method comprising the steps of:

inputting a first video signal having a first frame rate;

selecting either a first conversion or a second conversion in accordance with said first video signal and for converting the first video signal using the selected conversion into a second video signal having a second frame rate that is lower than the first frame rate, wherein the first conversion is selected when the first video signal is a result of a frame conversion of a video signal having the second frame rate based on a 2-3 pull down technique into the first video signal, the first conversion being a frame conversion with a reverse 2-3 pull down technique, and wherein the second conversion is selected when the first video signal is a pure video signal, said second conversion being a frame conversion using a frame-based skip process according to a conversion ratio, the conversion ratio being a ratio between said second frame rate and said first frame rate; and outputting said second video signal.

12. The frame conversion method according to claim 11, wherein said step of changing conversions allows said first conversion to be applied to said first video signal when said first video signal is generated by performing the same frame conversion as said frame conversion; and said step of changing conversions allows said second conversion to be applied to said first video signal when said frame conversion is not applied to said first video signal.

13. The frame conversion method according to claim 11, wherein said step of changing conversions allows said first conversion and said second conversion to be changed selectively in accordance with a mode signal to select one of said first conversion and said second conversion.

14. The frame conversion method according to claim 13, wherein said step of changing conversions allows said first conversion and said second conversion to be selectively changed by changing operations of writing and reading a video signal to and from a storage means for storing said input first video signal in accordance with said mode signal.

15. The frame conversion method according to claim 14, wherein said step of changing conversions follows said mode signal to change operations of a write count means for counting count values used for writing said first video signal to said storage means and a read count means for counting count values used for reading video signals stored in said storage means.

16. The frame conversion method according to claim 15, wherein when said frame conversion is not applied to said first video signal, said step of changing conversions provides said write count means with a pause period equivalent to a count corresponding to fields to be skipped while incrementing a count value and allows said read count means to continuously increment a count value.

17. The frame conversion method according to claim 11 further comprising a step of:

detecting a type of said first video signal in accordance with the presence or absence of duplicate fields constituting said first video signal, wherein said step of changing conversions selectively changes said first conversion and said second conversion in accordance with a type of said first video signal.

18. The frame conversion method according to claim 17, wherein said step of detecting a type of said first video signal detects the presence or absence of periodicity of duplicate fields constituting said first video signal.

19. The frame conversion method according to claim 17, wherein said step of detecting a type of said first video signal compares two of fields constituting said first video signal.

20. The frame conversion method according to claim 17, wherein said step of detecting a type of said first video signal generates a mode signal according to said detection result to select either of said first conversion and said second conversion; and said step of changing conversions selectively changes said first conversion and said second conversion according to said mode signal.

* * * * *